(12) United States Patent
Imura et al.

(10) Patent No.: US 12,404,936 B2
(45) Date of Patent: Sep. 2, 2025

(54) SLIDING COMPONENT

(71) Applicant: EAGLE INDUSTRY CO., LTD., Tokyo (JP)

(72) Inventors: Tadatsugu Imura, Tokyo (JP); Hiroshi Suzuki, Tokyo (JP); Shogo Fukuda, Tokyo (JP); Kenta Uchida, Tokyo (JP)

(73) Assignee: EAGLE INDUSRY CO., LTD., Tokyo (JP)

( * ) Notice: Subject to any disclaimer, the term of this patent is extended or adjusted under 35 U.S.C. 154(b) by 0 days.

(21) Appl. No.: 18/695,302

(22) PCT Filed: Sep. 14, 2022

(86) PCT No.: PCT/JP2022/034390
§ 371 (c)(1),
(2) Date: Mar. 25, 2024

(87) PCT Pub. No.: WO2023/053964
PCT Pub. Date: Apr. 6, 2023

(65) Prior Publication Data
US 2025/0003497 A1    Jan. 2, 2025

(30) Foreign Application Priority Data
Sep. 28, 2021 (JP) ................. 2021-158356

(51) Int. Cl.
*F16J 15/34* (2006.01)

(52) U.S. Cl.
CPC ....... *F16J 15/3416* (2013.01); *F16J 15/3412* (2013.01); *F16J 15/342* (2013.01)

(58) Field of Classification Search
CPC .... F16J 15/3412; F16J 15/3416; F16J 15/342; F16J 15/3424
See application file for complete search history.

(56) References Cited

U.S. PATENT DOCUMENTS

| RE24,651 E | 5/1959 | Anderson ............... F16L 21/05 |
| 3,085,808 A | 4/1963 | Williams ...................... 277/388 |
| 3,232,680 A | 2/1966 | Clark .............................. 384/110 |
| 3,410,565 A | 11/1968 | Williams ...................... 277/348 |
| 3,466,052 A | 9/1969 | Ludwig |
| 3,499,653 A | 3/1970 | Gardner ......................... 277/27 |

(Continued)

FOREIGN PATENT DOCUMENTS

| CN | 1364987 | 8/2002 | ............... F16J 15/40 |
| CN | 2534429 | 2/2003 | ............... F16J 15/40 |

(Continued)

OTHER PUBLICATIONS

U.S. Appl. No. 18/284,145, filed Sep. 26, 2023, Arai.

(Continued)

*Primary Examiner* — Nicholas L Foster
(74) *Attorney, Agent, or Firm* — HAYES SOLOWAY P.C.

(57) ABSTRACT

There is provided a sliding component that allows sliding surfaces to smoothly slide against each other from a low-speed state to a high-speed state in both forward and reverse relative rotation directions. A deep groove is provided that partitions a fluid-side region where a fluid-side groove and a fluid-side reverse groove are provided and a leakage-side region where leakage-side grooves and leakage-side reverse grooves are provided off from each other.

12 Claims, 9 Drawing Sheets

(56) References Cited

U.S. PATENT DOCUMENTS

| | | | |
|---|---|---|---|
| 3,527,465 A | 9/1970 | Guinard | 277/400 |
| 3,656,227 A | 4/1972 | Weinand | 29/530 |
| 3,675,935 A | 7/1972 | Ludwig | F16J 15/342 |
| 3,782,737 A | 1/1974 | Ludwig | |
| 3,804,424 A | 4/1974 | Gardner | 277/27 |
| 3,855,624 A | 12/1974 | Reinhoudt | F16C 17/045 |
| 3,870,382 A | 3/1975 | Reinhoudt | F16C 17/045 |
| 4,406,466 A | 9/1983 | Geary, Jr. | 277/347 |
| 4,486,026 A | 12/1984 | Furumura et al. | 277/80 |
| 4,523,764 A | 6/1985 | Albers | F16J 15/342 |
| 4,645,414 A | 2/1987 | DeHart | F04D 17/161 |
| 5,092,612 A | 3/1992 | Victor | 277/400 |
| 5,133,562 A | 7/1992 | Lipschitz | F16J 15/342 |
| 5,201,531 A | 4/1993 | Lai | F16J 15/3412 |
| 5,222,743 A | 6/1993 | Goldswain | 277/400 |
| 5,385,409 A | 1/1995 | Ide | F16J 15/3432 |
| 5,441,283 A | 8/1995 | Pecht et al. | 277/96.1 |
| 5,447,316 A | 9/1995 | Matsui | F16J 15/34 |
| 5,492,341 A | 2/1996 | Pecht | 277/400 |
| 5,496,047 A | 3/1996 | Goldswain | F16J 15/3412 |
| 5,498,007 A | 3/1996 | Kulkarni | 277/366 |
| 5,501,470 A | 3/1996 | Fuse | 277/400 |
| 5,529,318 A | 6/1996 | Fuse | F16J 15/3412 |
| 5,556,111 A | 9/1996 | Sedy | 277/96.1 |
| 5,605,339 A | 2/1997 | Pecht | F16J 15/3412 |
| 5,664,787 A | 9/1997 | Fuse et al. | F16J 15/34 |
| 5,702,110 A | 12/1997 | Sedy | |
| 5,895,051 A | 4/1999 | Bowers | B62D 5/22 |
| 6,142,478 A | 11/2000 | Pecht | F16J 15/3484 |
| 6,189,896 B1 | 2/2001 | Dickey et al. | F16L 17/06 |
| 6,446,976 B1 | 9/2002 | Key | 277/367 |
| 6,575,470 B1 | 6/2003 | Gacek | F16J 15/3412 |
| 6,817,766 B2 | 11/2004 | Gomyo | F16C 32/06 |
| 7,044,470 B2 | 5/2006 | Zheng | F16J 15/342 |
| 7,510,330 B2 | 3/2009 | Obara | F16C 32/06 |
| 7,568,839 B2 | 8/2009 | Gotoh et al. | F16C 32/06 |
| 7,744,094 B2 | 6/2010 | Yanagisawa | F16J 15/342 |
| 7,758,051 B2 | 7/2010 | Roberts-Haritonov et al. F16J 15/34 | |
| 7,780,399 B1 | 8/2010 | Garrison | F01D 25/183 |
| 8,162,322 B2 | 4/2012 | Flaherty | F16J 15/3412 |
| 9,062,775 B2 | 6/2015 | Short et al. | F16J 15/34 |
| 9,353,865 B2 | 5/2016 | Lattin | F16N 21/00 |
| 9,353,867 B2 | 5/2016 | Itadani | F16J 15/342 |
| 9,371,912 B2 | 6/2016 | Hosoe et al. | F16J 15/34 |
| 9,587,745 B2 | 3/2017 | Itadani et al. | F16J 15/3412 |
| 9,611,938 B1 | 4/2017 | Itadani | F16J 15/3416 |
| 9,677,670 B2 | 6/2017 | Itadani et al. | F16J 15/34 |
| 9,829,109 B2 | 11/2017 | Itadani et al. | F16J 15/3412 |
| 9,845,886 B2 | 12/2017 | Itadani | F16C 17/045 |
| 9,951,873 B2 | 4/2018 | Inoue et al. | F16J 15/34 |
| 9,982,784 B2 | 5/2018 | Osada et al. | F16J 15/34 |
| 10,054,230 B2 | 8/2018 | Katori | F16J 15/34 |
| 10,072,759 B2 | 9/2018 | Inoue et al. | F16J 15/34 |
| 10,113,648 B2 | 10/2018 | Inoue et al. | F16J 15/342 |
| 10,190,689 B2 | 1/2019 | Yoshida | F16J 15/3412 |
| 10,337,560 B2 | 7/2019 | Takunaga | F16C 33/80 |
| 10,337,620 B2 | 7/2019 | Tokunaga et al. | F16J 15/342 |
| 10,352,450 B2 | 7/2019 | Yamanaka et al. | F16J 15/3204 |
| 10,408,349 B2 | 9/2019 | Miyazaki | F16J 15/3272 |
| 10,473,220 B2 | 11/2019 | Tokunaga et al. | F16J 15/34 |
| 10,487,944 B2 | 11/2019 | Itadani | F16J 15/3496 |
| 10,487,948 B2 | 11/2019 | Inoue et al. | F16J 15/342 |
| 10,495,228 B2 | 12/2019 | Itadani et al. | F16J 15/34 |
| 10,648,569 B2 | 5/2020 | Itadani | F16K 15/34 |
| 10,655,736 B2 | 5/2020 | Itadani | F16J 15/3416 |
| 10,704,417 B2 | 7/2020 | Tokunaga et al. | F01D 25/16 |
| 10,781,924 B2 | 9/2020 | Inoue et al. | F16J 15/342 |
| 10,883,603 B2 | 1/2021 | Inoue et al. | F16J 15/342 |
| 10,883,604 B2 | 1/2021 | Inoue et al. | F16J 15/342 |
| 11,009,072 B2 | 5/2021 | Kimura et al. | F16J 15/34 |
| 11,009,130 B2 | 5/2021 | Itadani | F16J 15/3284 |
| 11,125,335 B2 | 9/2021 | Kimura et al. | F16J 15/34 |
| 11,221,071 B2 | 1/2022 | Sasaki | F16C 17/04 |
| 11,525,512 B2 | 12/2022 | Kimura | F16J 15/3412 |
| 11,530,749 B2 | 12/2022 | Kimura | F16J 15/441 |
| 11,603,934 B2 | 3/2023 | Imura | F16J 15/3412 |
| 11,644,100 B2 | 5/2023 | Kimura | F16J 15/324 |
| 11,739,844 B2 | 8/2023 | Katori et al. | F16J 15/34 |
| 11,821,461 B2 | 11/2023 | Ou et al. | F16J 15/34 |
| 11,821,521 B2 | 11/2023 | Imura | F16J 15/342 |
| 11,852,241 B2* | 12/2023 | Suzuki | F16C 33/106 |
| 11,892,081 B2 | 2/2024 | Inoue et al. | F16J 15/34 |
| 12,049,962 B2* | 7/2024 | Ou | F16J 15/3256 |
| 12,188,516 B2* | 1/2025 | Negishi | F16C 17/028 |
| 12,209,668 B2* | 1/2025 | Imura | F16C 33/74 |
| 2002/0093141 A1 | 7/2002 | Wang | 277/358 |
| 2003/0178781 A1 | 9/2003 | Tejima | |
| 2003/0189294 A1 | 10/2003 | Tejima | F16J 15/34 |
| 2004/0080112 A1 | 4/2004 | Tejima | 277/306 |
| 2005/0135714 A1 | 6/2005 | Rahman | F16C 17/107 |
| 2005/0141789 A1 | 6/2005 | Kita et al. | F16C 32/06 |
| 2005/0212217 A1 | 9/2005 | Tejima | 277/399 |
| 2006/0093245 A1 | 5/2006 | Han | G11B 19/2018 |
| 2007/0296156 A1 | 12/2007 | Yanagisawa et al. | F16J 15/34 |
| 2008/0100001 A1 | 5/2008 | Flaherty | 277/400 |
| 2008/0272552 A1 | 11/2008 | Zheng | 277/400 |
| 2010/0066027 A1 | 3/2010 | Vasagar | 277/350 |
| 2011/0101616 A1 | 5/2011 | Teshima | 277/358 |
| 2012/0018957 A1 | 1/2012 | Watanabe | 277/387 |
| 2013/0209011 A1 | 8/2013 | Tokunaga | F16C 32/0633 |
| 2014/0203517 A1 | 7/2014 | Ferris | F16K 15/3412 |
| 2015/0115537 A1 | 4/2015 | Tokunaga | F16J 15/34 |
| 2015/0115540 A1 | 4/2015 | Tokunaga | F16J 15/34 |
| 2015/0123350 A1 | 5/2015 | Itadani | 277/400 |
| 2015/0184752 A1 | 7/2015 | Itadani | F16J 15/3412 |
| 2015/0226334 A1 | 8/2015 | Itadani | F16J 15/342 |
| 2015/0240950 A1 | 8/2015 | Takahashi | F16J 15/363 |
| 2015/0260292 A1 | 9/2015 | Inoue et al. | F16J 15/342 |
| 2015/0377297 A1 | 12/2015 | Tokunaga et al. | F16C 33/748 |
| 2015/0377360 A1 | 12/2015 | Itadani | F16J 15/3412 |
| 2016/0003361 A1 | 1/2016 | Takahashi | F16J 15/3408 |
| 2016/0033045 A1 | 2/2016 | Itadani et al. | F16J 15/3412 |
| 2016/0097457 A1 | 4/2016 | Sun et al. | F16J 15/34 |
| 2016/0252182 A1 | 9/2016 | Itadani et al. | F16J 15/34 |
| 2017/0009889 A1 | 1/2017 | Seki | F16J 15/3272 |
| 2017/0114902 A1 | 4/2017 | Itadani | F16J 15/3412 |
| 2017/0130844 A1 | 5/2017 | Itadani | F16J 15/3412 |
| 2017/0167615 A1 | 6/2017 | Itadani | F16J 15/3412 |
| 2017/0198814 A1 | 7/2017 | Colombo et al. | F16J 15/3412 |
| 2017/0234431 A1 | 8/2017 | Katori et al. | F16J 15/3412 |
| 2017/0241549 A1 | 8/2017 | Itadani | F16J 15/40 |
| 2018/0010690 A1* | 1/2018 | Itadani | F04D 29/126 |
| 2018/0051809 A1 | 2/2018 | Yoshida | F16H 15/3412 |
| 2018/0058584 A1 | 3/2018 | Miyazaki | F16J 15/164 |
| 2018/0073394 A1 | 3/2018 | Tokunaga et al. | F01D 25/183 |
| 2018/0128377 A1 | 5/2018 | Tokunaga et al. | F16J 15/342 |
| 2018/0128378 A1 | 5/2018 | Tokunaga et al. | F16J 15/3412 |
| 2018/0135699 A1 | 5/2018 | Takunaga | F16J 15/348 |
| 2018/0195618 A1 | 7/2018 | Itadani | F16J 15/342 |
| 2019/0178386 A1 | 6/2019 | Arai | F16J 15/3496 |
| 2019/0285115 A1* | 9/2019 | Negishi | F16C 17/045 |
| 2019/0301522 A1 | 10/2019 | Negishi et al. | F16C 17/026 |
| 2019/0376558 A1 | 12/2019 | Kimura | F16C 33/743 |
| 2020/0182299 A1 | 6/2020 | Kimura | F16C 17/026 |
| 2021/0054935 A1 | 2/2021 | Kimura | F16J 15/3412 |
| 2021/0080006 A1 | 3/2021 | Sasaki | F16J 15/34 |
| 2021/0116029 A1 | 4/2021 | Kimura | F16J 15/324 |
| 2021/0116030 A1 | 4/2021 | Kimura | |
| 2021/0116032 A1 | 4/2021 | Kimura | F16J 15/188 |
| 2021/0164571 A1 | 6/2021 | Kimura | F16J 15/3412 |
| 2022/0010835 A1 | 1/2022 | Inoue | F16C 17/045 |
| 2022/0056956 A1* | 2/2022 | Imura | F16J 15/3412 |
| 2022/0099188 A1* | 3/2022 | Imura | F16C 33/107 |
| 2022/0099189 A1* | 3/2022 | Suzuki | F16C 33/1065 |
| 2022/0099190 A1* | 3/2022 | Ou | F16C 33/74 |
| 2022/0099191 A1* | 3/2022 | Suzuki | F16C 33/103 |
| 2022/0120315 A1* | 4/2022 | Ou | F16J 15/34 |
| 2022/0128088 A1* | 4/2022 | Suzuki | F16J 15/3412 |
| 2022/0145992 A1 | 5/2022 | Miyazaki | F16C 33/107 |
| 2022/0275828 A1 | 9/2022 | Inoue | F16J 15/3424 |
| 2022/0389961 A1 | 12/2022 | Arai | F16C 33/74 |
| 2023/0228292 A1* | 7/2023 | Negishi | F16J 15/3416 384/292 |

(56) References Cited

U.S. PATENT DOCUMENTS

| | | | |
|---|---|---|---|
| 2023/0235780 A1* | 7/2023 | Negishi | F16J 15/3412 384/292 |
| 2023/0258184 A1 | 8/2023 | Suzuki | F04C 29/00 |
| 2023/0391912 A1 | 12/2023 | Isaka | C08F 214/262 |
| 2024/0309910 A1* | 9/2024 | Fukuda | F16J 15/3416 |
| 2024/0344555 A1* | 10/2024 | Imura | F16J 15/3412 |
| 2025/0003496 A1* | 1/2025 | Ou | F16C 33/74 |

FOREIGN PATENT DOCUMENTS

| | | | |
|---|---|---|---|
| CN | 1401924 | 3/2003 | F16J 15/16 |
| CN | 101749431 | 6/2010 | F16J 15/34 |
| CN | 101776152 | 7/2010 | F16J 15/48 |
| CN | 201582390 | 9/2010 | F16J 15/16 |
| CN | 103267132 | 8/2013 | F16J 15/54 |
| CN | 103732958 | 4/2014 | F16J 15/34 |
| CN | 103791097 | 5/2014 | F16J 15/34 |
| CN | 104019237 | 9/2014 | F16J 15/16 |
| CN | 104165229 | 11/2014 | F16J 15/40 |
| CN | 105683632 | 6/2016 | F04D 29/10 |
| CN | 106439037 | 2/2017 | F16J 15/34 |
| CN | 206017723 | 3/2017 | F16J 15/16 |
| CN | 107166036 | 9/2017 | F16J 15/16 |
| CN | 107532724 | 1/2018 | F16J 15/34 |
| CN | 107676484 | 2/2018 | F16J 15/3232 |
| CN | 108506494 | 9/2018 | F16J 15/34 |
| DE | 3619489 | 12/1987 | F16J 15/34 |
| DE | 4407453 | 9/1995 | F16C 17/08 |
| EP | 0637706 | 8/1993 | F16J 15/34 |
| EP | 0896163 | 2/1999 | F16C 33/10 |
| EP | 2520835 | 11/2012 | F16J 15/34 |
| EP | 2626604 | 8/2013 | F16J 15/34 |
| EP | 2977655 | 1/2016 | F16J 15/34 |
| EP | 3091258 | 11/2016 | F16J 15/34 |
| EP | 3299686 | 3/2018 | F16J 15/34 |
| EP | 3514414 | 7/2019 | F16J 15/34 |
| EP | 3922872 | 12/2021 | F16J 15/34 |
| EP | 3926187 | 12/2021 | F16C 17/04 |
| EP | 3926188 | 12/2021 | F16C 17/04 |
| EP | 3943765 | 1/2022 | F16C 17/04 |
| FR | 1450389 | 6/1966 | |
| GB | 1509482 | 5/1978 | F16C 33/10 |
| JP | 36-6305 | 5/1961 | |
| JP | S49-33614 | 9/1974 | F16J 15/34 |
| JP | S54-77305 | 6/1979 | B06B 9/10 |
| JP | S55-177549 | 12/1980 | F16J 15/16 |
| JP | S57-146955 | 9/1982 | F16J 15/34 |
| JP | 58-109771 | 6/1983 | F16J 15/34 |
| JP | 58-137667 | 8/1983 | F16J 15/40 |
| JP | S59-58252 | 4/1984 | F16J 15/34 |
| JP | S59131567 | 7/1984 | F16C 33/12 |
| JP | S60-107461 | 7/1985 | B63H 26/36 |
| JP | S6182177 | 5/1986 | F16J 15/34 |
| JP | S62-37572 | 2/1987 | F16J 51/34 |
| JP | S63-033027 | 3/1988 | F16C 33/46 |
| JP | S6376959 | 4/1988 | C01B 31/02 |
| JP | S63163025 | 7/1988 | C09K 3/14 |
| JP | S63-190975 | 8/1988 | F16J 15/34 |
| JP | H01133572 | 9/1989 | F16J 15/34 |
| JP | 2-236067 | 9/1990 | F16J 15/34 |
| JP | 3-14371 | 2/1991 | F16J 15/34 |
| JP | 3-35372 | 4/1991 | F16J 15/34 |
| JP | 3-41267 | 4/1991 | F16J 15/34 |
| JP | 3-41268 | 4/1991 | F16J 15/34 |
| JP | H0473 | 1/1992 | F16J 15/34 |
| JP | H723271 | 3/1992 | C04B 41/87 |
| JP | H04145267 | 5/1992 | F16J 15/34 |
| JP | H0496571 | 8/1992 | F16J 15/34 |
| JP | H0590048 | 12/1993 | F16J 15/34 |
| JP | H05322050 | 12/1993 | F16J 15/34 |
| JP | H0755016 | 3/1995 | F16J 15/34 |
| JP | H0889489 | 4/1996 | A61B 5/05 |
| JP | H09503276 | 3/1997 | F16J 15/34 |
| JP | H09329247 | 12/1997 | F16J 15/34 |
| JP | H1038093 | 2/1998 | F16J 15/34 |
| JP | H10281299 | 10/1998 | F16J 15/34 |
| JP | 2000179543 | 6/2000 | F16C 17/10 |
| JP | 2001295833 | 10/2001 | F16C 17/04 |
| JP | 2001317638 | 11/2001 | F16J 15/34 |
| JP | 2003161322 | 6/2003 | F16C 33/10 |
| JP | 2003343741 | 12/2003 | F16J 15/34 |
| JP | 2004003578 | 1/2004 | F16J 15/34 |
| JP | 2004225725 | 8/2004 | C10M 103/02 |
| JP | 2005188651 | 7/2005 | F16J 15/34 |
| JP | 2005321002 | 11/2005 | F16J 15/34 |
| JP | 200558051 | 12/2005 | F16C 33/74 |
| JP | 20069828 | 1/2006 | F16C 17/02 |
| JP | 2006022834 | 1/2006 | F16J 15/34 |
| JP | 200677899 | 3/2006 | F16J 15/34 |
| JP | 2007162045 | 6/2007 | C23C 14/06 |
| JP | 2008128220 | 6/2008 | F04B 39/00 |
| JP | 2008144864 | 6/2008 | F16C 33/10 |
| JP | 2009091661 | 4/2009 | B22F 7/00 |
| JP | 2009250378 | 10/2009 | F16J 15/34 |
| JP | 2010133496 | 6/2010 | F16J 15/34 |
| JP | 2010216587 | 9/2010 | F16J 15/34 |
| JP | 201158517 | 3/2011 | F16J 18/34 |
| JP | 2011185292 | 9/2011 | F16J 15/34 |
| JP | 2011196429 | 10/2011 | F16J 15/34 |
| JP | 20122295 | 1/2012 | F16J 15/34 |
| JP | 5271858 | 5/2013 | F16J 15/34 |
| JP | WO2014042045 | 3/2014 | F16J 15/34 |
| JP | 2014169787 | 9/2014 | C08F 292/00 |
| JP | 5905699 | 4/2016 | F16C 17/02 |
| JP | 201680090 | 5/2016 | F16J 15/34 |
| JP | 2017141961 | 8/2017 | F16J 15/34 |
| JP | 6444492 | 12/2018 | F16J 15/34 |
| JP | 201913446 | 1/2019 | A47J 27/00 |
| JP | 201915309 | 1/2019 | F16J 15/34 |
| JP | 201915401 | 1/2019 | F16J 15/34 |
| JP | 2019190644 | 10/2019 | F04D 29/04 |
| JP | 2020125838 | 8/2020 | F16C 17/02 |
| JP | 2020173020 | 10/2020 | F16C 33/74 |
| WO | WO9506832 | 3/1995 | F16J 15/34 |
| WO | WO2012046749 | 4/2012 | F16J 15/34 |
| WO | WO2014024742 | 2/2014 | F16J 15/34 |
| WO | WO2014050920 | 4/2014 | F16J 15/34 |
| WO | WO2014103630 | 7/2014 | F16J 15/34 |
| WO | WO2014103631 | 7/2014 | F16J 15/34 |
| WO | WO2014112455 | 7/2014 | F16J 15/34 |
| WO | WO2014148316 | 9/2014 | F16J 15/34 |
| WO | WO2014174725 | 10/2014 | F16J 15/34 |
| WO | WO2016009408 | 1/2016 | F16J 15/34 |
| WO | WO2016035860 | 3/2016 | F16J 15/34 |
| WO | WO2016167262 | 10/2016 | F16J 15/10 |
| WO | WO2016186019 | 11/2016 | F16J 15/34 |
| WO | WO2016203878 | 12/2016 | F16J 15/34 |
| WO | WO2017002774 | 1/2017 | F16J 15/34 |
| WO | WO2018034197 | 2/2018 | F16J 15/34 |
| WO | WO2018051867 | 3/2018 | F16J 15/34 |
| WO | WO2018105505 | 6/2018 | F16J 15/34 |
| WO | WO2018139231 | 8/2018 | F16J 15/34 |
| WO | WO2018139232 | 8/2018 | F16C 33/10 |
| WO | WO2020130087 | 6/2020 | F16J 15/34 |
| WO | WO2020166588 | 8/2020 | F16C 17/04 |
| WO | WO2021020074 | 2/2021 | F16J 15/34 |

OTHER PUBLICATIONS

U.S. Appl. No. 12/284,281, filed Sep. 26, 2023, Arai.
Definition of groove by Merriam Webster.
PCT International Search Report, Written Opinion and International Preliminary Report on Patentability issued in PCT/JP2022/012343, dated May 31, 2023 with English Translation, 21 pages.
PCT International Search Report, Written Opinion and International Preliminary Report on Patentability issued in PCT/JP2022/012342, dated May 31, 2023 with English Translation, 20 pages.

(56) References Cited

OTHER PUBLICATIONS

PCT International Search Report, Written Opinion and International Preliminary Report on Patentability issued in PCT/JP2022/034390, dated Nov. 22, 2022 with English Translation, 24 pages.

* cited by examiner

SLIDING COMPONENT

TECHNICAL FIELD

The present invention relates to a sliding component, for example, a sliding component used for a shaft seal or a bearing.

BACKGROUND ART

As a sliding component that prevents a leakage of a sealed fluid around a rotating shaft of a rotating machine, for example, there is known a mechanical seal including a pair of sliding rings having an annular shape which rotate relative to each other and of which sliding surfaces slide against each other. In such a mechanical seal, in recent years, a reduction in energy loss caused by sliding has been desired for environmental measures and the like, and dynamic pressure generation grooves may be provided on a sliding surface of a sliding ring.

For example, in a mechanical seal disclosed in Patent Citation 1, a plurality of spiral grooves on a radially inner side and a plurality of spiral grooves on a radially outer side are provided on a sliding surface of one sliding ring. The spiral grooves on the radially inner side communicate with a space on a leakage side that is the radially inner side of the sliding surface, and extend in a radially outward direction while inclining in one circumferential direction. In addition, the spiral grooves on the radially outer side communicate with a space on a sealed fluid side that is the radially outer side of the sliding surface, and extend in a radially inward direction while inclining in the other circumferential direction. Since the spiral grooves extend in a radial direction while inclining in the circumferential directions in such a manner, a higher dynamic pressure generation capability can be obtained compared to recessed portions or grooves such as Rayleigh steps extending along the radial direction or dimples.

When the sliding rings rotate relative to each other at low speed, a sealed fluid flows into a gap between the sliding surfaces from the spiral grooves on the radially outer side, and a liquid film is formed. In addition, when the sliding rings rotate relative to each other at high speed, a gas on the leakage side is suctioned from starting end portions on the radially inner side of the spiral grooves on the radially inner side, and a dynamic pressure is generated at terminating end portions, so that the sliding surfaces are slightly separated from each other, and the lubricity between the sliding surfaces is improved. In addition, when the sliding rings rotate relative to each other at high speed, the spiral grooves on the radially outer side suction the sealed fluid between the sliding surfaces, and discharge the sealed fluid to the radially outer side, so that the leakage of the sealed fluid into the space on the leakage side is suppressed.

CITATION LIST

Patent Literature

Patent Citation 1: WO 2018/051867 A (Page 10, FIG. 2)

SUMMARY OF INVENTION

Technical Problem

Depending on the type of the rotating machine, the rotation direction may be switched according to the situation, and a mechanical seal capable of coping with both the relative rotation directions of the sliding rings has been desired. However, the mechanical seal as disclosed in Patent Citation 1 can be used when the sliding rings rotate relative to each other at low speed in a reverse direction, but cannot actually be used during high-speed rotation, and cannot cope with an operation from a low-speed state to a high-speed state in both the relative rotation directions of the sliding rings.

The present invention has been made in view of such problems, and an object of the present invention is to provide a sliding component that allows sliding surfaces to smoothly slide against each other from a low-speed state to a high-speed state in both forward and reverse relative rotation directions.

Solution to Problem

In order to solve the foregoing problems, according to the present invention, there is provided a sliding component including a pair of sliding surfaces disposed in a rotating machine to face each other at a location where the pair of sliding surfaces rotate relative to each other when the rotating machine is driven, and partitioning a fluid-side space and a leakage-side space off from each other, wherein one of the sliding surfaces is provided with: a fluid-side groove communicating with the fluid-side space and extending in a forward direction of relative rotation of the one of the sliding surfaces; a fluid-side reverse groove communicating with the fluid-side space and extending in a reverse direction of the relative rotation; a leakage-side groove of which at least one end portion is disposed closer to a side of the leakage-side space than the fluid-side groove and the fluid-side reverse groove, and which extends from the end portion toward the fluid-side space in the forward direction of the relative rotation; a leakage-side reverse groove of which at least one end portion is disposed closer to the side of the leakage-side space than the fluid-side groove and the fluid-side reverse groove, and which extends from the end portion toward the fluid-side space in the reverse direction of the relative rotation; and a deep groove that partitions a fluid-side region where the fluid-side groove and the fluid-side reverse groove are provided and a leakage-side region where the leakage-side groove and the leakage-side reverse groove are provided off from each other. According to the aforesaid feature of the present invention, when the relative rotation of the sliding component is low-speed forward rotation, the lubricity between the sliding surfaces is improved mainly by a sealed fluid supplied from a closed end portion of the fluid-side groove into a gap between the sliding surfaces. During high-speed forward rotation, since the sealed fluid supplied from the fluid-side groove into the gap between the sliding surfaces is collected in the deep groove, a positive pressure in the fluid-side groove is suppressed. In addition, when the relative rotation is low-speed reverse rotation, the lubricity between the sliding surfaces is improved mainly by the sealed fluid supplied from a closed end portion of the fluid-side reverse groove into the gap between the sliding surfaces. During high-speed reverse rotation, since the sealed fluid supplied from the fluid-side reverse groove into the gap between the sliding surfaces is collected in the deep groove, a positive pressure in the fluid-side reverse groove is suppressed. In addition, since the fluid that has flowed into the gap between the sliding surfaces from the closed end portion of one fluid-side groove or the fluid-side reverse groove is collected by the other fluid-side groove or the fluid-side reverse groove and the deep groove, the leakage of the sealed fluid into the leakage-side space due to the suction function of the leakage-side groove or the leakage-side reverse groove is suppressed.

It may be preferable that the deep groove communicates with the fluid-side space. According to this preferable configuration, since the fluid from the fluid-side space flows in and out from the deep groove, the amount of the sealed fluid in the deep groove is stabilized.

It may be preferable that each of leakage-side end portions of the leakage-side groove and the leakage-side reverse groove communicates with the leakage-side space. According to this preferable configuration, during relative rotation in the forward direction, a leakage-side fluid can be efficiently introduced from the leakage-side space into the leakage-side groove, and during relative rotation in the reverse direction, the leakage-side fluid can be efficiently introduced from the leakage-side space into the leakage-side reverse groove.

It may be preferable that the one of the sliding surfaces is provided with a communication groove communicating with each of leakage-side end portions of the leakage-side groove and the leakage-side reverse groove. According to this preferable configuration, during relative rotation in the forward direction, the fluid collected in the leakage-side reverse groove can be guided to the leakage-side groove through the communication groove, and during relative rotation in the reverse direction, the fluid collected in the leakage-side groove can be guided to the leakage-side reverse groove through the communication groove.

It may be preferable that the communication groove has an annular shape. According to this preferable configuration, the fluid suctioned into the leakage-side groove or the leakage-side reverse groove can be collected in the communication groove having an annular shape, and the fluid in the communication groove having an annular shape can be guided to the leakage-side groove or the leakage-side reverse groove. Further, since a land is formed on a leakage side of the annular deep groove, the fluid collected in the communication groove is less likely to leak into the leakage-side space.

It may be preferable that each of terminating end portions of the leakage-side groove and the leakage-side reverse groove is disposed closer to a fluid-side space side than each of terminating end portions of the fluid-side groove and the fluid-side reverse groove. According to this preferable configuration, a sufficient length can be ensured for each of the grooves.

It may be preferable that the fluid-side groove, the leakage-side reverse groove, the fluid-side reverse groove, and the leakage-side groove are disposed in an inclined manner, and the deep groove includes a first inclined portion extending along the fluid-side groove and the leakage-side reverse groove, and a second inclined portion extending along the fluid-side reverse groove and the leakage-side groove. According to this preferable configuration, since the first inclined portion can be disposed between the fluid-side groove and the leakage-side reverse groove, and the second inclined portion can be disposed between the fluid-side reverse groove and the leakage-side groove, a plurality of the grooves can be efficiently disposed in a circumferential direction.

DESCRIPTION OF EMBODIMENTS

Figure 1:
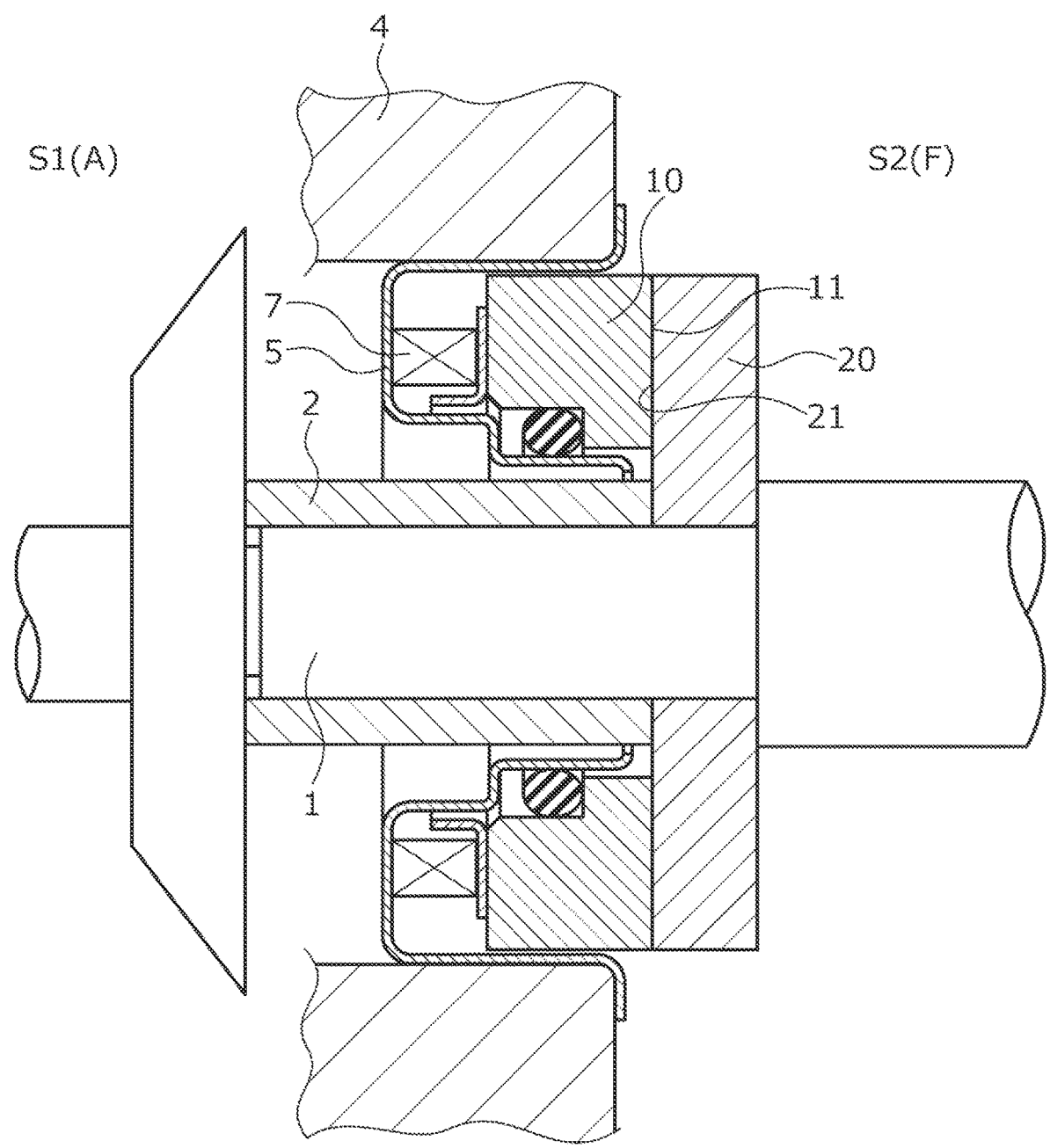
FIG. 1 is a longitudinal sectional view illustrating one example of a mechanical seal as a sliding component according to a first embodiment of the present invention.

Modes for implementing a sliding component according to the present invention will be described below based on embodiments.

First Embodiment

A sliding component according to a first embodiment of the present invention will be described with reference to FIGS. 1 to 4. Incidentally, in the present embodiment, a mechanical seal will be described as an example of the sliding component. The mechanical seal of the present embodiment will be described as being configured such that atmosphere A exists in an inner space S1, a sealed fluid F exists in an outer space S2, a radially inner side of sliding rings constituting the mechanical seal is a leakage side (low-pressure side), and a radially outer side is a sealed fluid side (high-pressure side). In addition, for convenience of description, in the drawings, dots may be added to grooves and the like formed on a sliding surface.

The mechanical seal illustrated in FIG. 1 is an inside mechanical seal that seals the sealed fluid F in the outer space S2 as a fluid-side space, which tends to leak from the radially outer side toward the radially inner side of sliding surfaces, and that allows the inner space S1 as a leakage-side space to communicate with the atmosphere A. Incidentally, in the present embodiment, a mode in which the sealed fluid F is a high-pressure liquid and the atmosphere A is a gas having a lower pressure than the sealed fluid F will be provided as an example.

The mechanical seal mainly includes a stationary seal ring 10 and a rotating seal ring 20. The stationary seal ring 10 has an annular shape, and is provided on a seal cover 5 fixed to a housing 4 of an attached device, so as to be non-rotatable and movable in an axial direction. The rotating seal ring 20 has an annular shape, and is provided on a rotating shaft 1 via a sleeve 2 so as to be rotatable together with the rotating shaft 1. The stationary seal ring 10 is biased in the axial direction by an elastic member 7, so that a sliding surface 11 of the stationary seal ring 10 and a sliding surface 21 of the rotating seal ring 20 slide in close contact with each other. Incidentally, the sliding surface 21 of the rotating seal ring 20 is a flat surface, and a recessed portion such as a groove is not provided on the flat surface.

The stationary seal ring 10 and the rotating seal ring 20 are typically made of SiC (as an example of hard material) or a combination of SiC and carbon (as an example of soft material); however, the present invention is not limited to these materials, and any sliding material that is used as a sliding material for mechanical seals can be applied. Incidentally, examples of SiC include sintered bodies using boron, aluminum, carbon, or the like as a sintering aid, and materials consisting of two or more phases with different components and compositions, such as SiC in which graphite particles are dispersed, reaction-sintered SiC consisting of SiC and Si, SiC—TiC, and SiC—TiN. As carbon, mixed carbon of a carbonaceous substance and a graphitic substance, resin-molded carbon, sintered carbon, and the like can be used. In addition, in addition to the above-described sliding materials, metal materials, resin materials, surface modification materials (e.g., coating materials), composite materials, and the like can also be applied.

Figure 2:
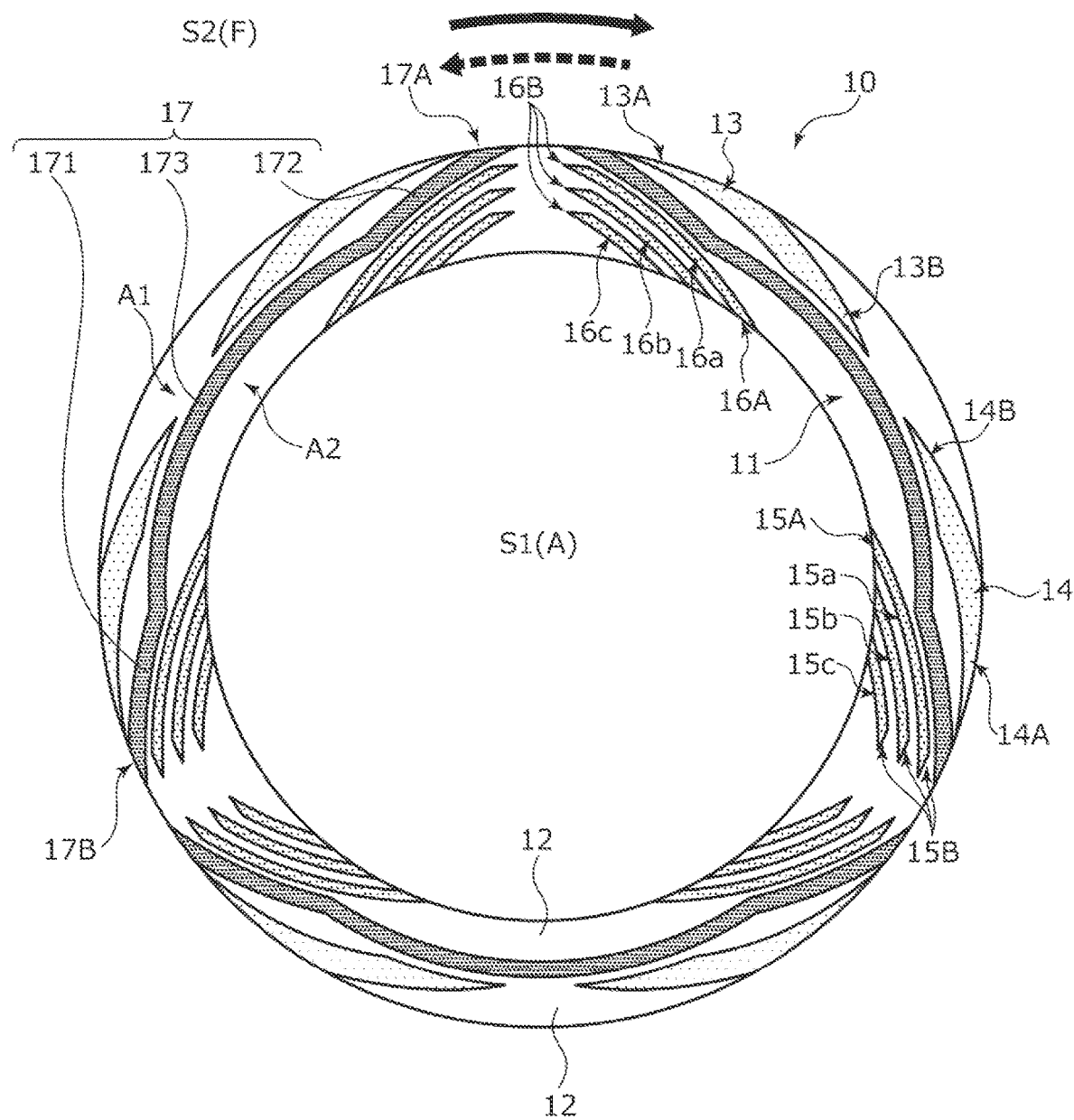
FIG. 2 is a view of a sliding surface of a stationary seal ring in the first embodiment as viewed in an axial direction.

As illustrated in FIG. 2, the rotating seal ring 20 that is a mating seal ring slides relative to the stationary seal ring 10 clockwise as indicated by a solid arrow or counterclockwise as indicated by a dashed arrow. Hereinafter, the direction of the solid arrow will be described as a forward rotation direction of the rotating seal ring 20, and the direction of the dashed arrow will be described as a reverse rotation direction of the rotating seal ring 20.

The sliding surface 11 of the stationary seal ring 10 is provided with a plurality of fluid-side spiral grooves 13 as fluid-side grooves; a plurality of fluid-side reverse spiral grooves 14 as fluid-side reverse grooves; a plurality of leakage-side spiral grooves 15a to 15c as leakage-side grooves; a plurality of leakage-side reverse spiral grooves 16a to 16c as leakage-side reverse grooves; and a plurality of deep grooves 17. Here, in this specification, the spiral grooves are configured such that each extension direction of the grooves has both a radial component and a circumferential component.

The plurality (three in the present embodiment) of fluid-side spiral grooves 13 are arranged in a circumferential direction on the radially outer side of the sliding surface 11. The fluid-side spiral grooves 13 communicate with the outer space S2 at end portions 13A on the radially outer side of the fluid-side spiral grooves 13, and extend in the forward rotation direction of the rotating seal ring 20, namely, in one circumferential direction with reference to communication locations thereof.

In detail, the fluid-side spiral grooves 13 are spiral grooves extending in an arcuate shape while inclining with a clockwise component from the radially outer side toward the radially inner side. In addition, end portions 13B on the radially inner side of the fluid-side spiral grooves 13 have a closed shape, namely, are closed end portions. The fluid-side spiral grooves 13 have a constant depth in the extension direction.

The plurality (three in the present embodiment) of fluid-side reverse spiral grooves 14 are arranged in the circumferential direction on the radially outer side of the sliding surface 11. The fluid-side reverse spiral grooves 14 communicate with the outer space S2 at end portions 14A on the radially outer side of the fluid-side reverse spiral grooves 14, and extend in the reverse rotation direction of the rotating seal ring 20, namely, in the other circumferential direction with reference to communication locations thereof.

In detail, the fluid-side reverse spiral grooves 14 are spiral grooves extending in an arcuate shape while inclining with a counterclockwise component from the radially outer side toward the radially inner side. In addition, end portions 14B on the radially inner side of the fluid-side reverse spiral grooves 14 have a closed shape, namely, are closed end portions. The fluid-side reverse spiral grooves 14 have a constant depth in the extension direction. Incidentally, in the present embodiment, the fluid-side spiral grooves 13 and the fluid-side reverse spiral grooves 14 have the same depth. In other words, the fluid-side reverse spiral grooves 14 have a symmetrical shape with respect to the fluid-side spiral grooves 13 in the circumferential direction.

The plurality of each (three each in the present embodiment) of the leakage-side spiral grooves 15a to 15c are arranged in the circumferential direction on the radially inner side of the sliding surface 11. The leakage-side spiral grooves 15a to 15c communicate with the inner space S1 at leakage-side end portions of the leakage-side spiral grooves 15a to 15c, namely, end portions 15A on the radially inner side, and extend in the forward rotation direction of the rotating seal ring 20, namely, in the one circumferential direction with reference to communication locations thereof. The leakage-side spiral grooves 15a to 15c extend substantially parallel to the fluid-side spiral grooves 13.

In detail, the leakage-side spiral grooves 15a to 15c are spiral grooves extending in an arcuate shape while inclining with a clockwise component from the radially inner side toward the radially outer side. In addition, end portions 15B on the radially outer side of the leakage-side spiral grooves 15a to 15c have a closed shape, namely, are closed end portions. The leakage-side spiral grooves 15a to 15c have a constant depth in the extension direction.

In addition, the three leakage-side spiral grooves 15a to 15c have different lengths. The leakage-side spiral groove 15a is longer than the leakage-side spiral groove 15b, and the leakage-side spiral groove 15b is longer than the leakage-side spiral groove 15c. The end portions 15B of the leakage-side spiral grooves 15a to 15c are disposed side by side in the radial direction.

In addition, the end portions 15B of the leakage-side spiral grooves 15a to 15c are disposed closer to the radially outer side than the end portions 13B of the fluid-side spiral grooves 13 and the end portions 14B of the fluid-side reverse spiral grooves 14.

The plurality of each (three each in the present embodiment) of the leakage-side reverse spiral grooves 16a to 16c are arranged in the circumferential direction on the radially inner side of the sliding surface 11. The leakage-side reverse spiral grooves 16a to 16c communicate with the inner space S1 at leakage-side end portions of the leakage-side reverse spiral grooves 16a to 16c, namely, end portions 16A on the radially inner side, and extend in the reverse rotation direction of the rotating seal ring 20, namely, in the other circumferential direction with reference to communication locations thereof. The leakage-side reverse spiral grooves 16a to 16c extend substantially parallel to the fluid-side reverse spiral grooves 14.

In detail, the leakage-side reverse spiral grooves 16a to 16c are spiral grooves extending in an arcuate shape while inclining with a counterclockwise component from the radially inner side toward the radially outer side. In addition, end portions 16B on the radially outer side of the leakage-side reverse spiral grooves 16a to 16c have a closed shape, namely, are closed end portions. In other words, the leakage-side reverse spiral grooves 16a to 16c have a symmetrical shape with respect to the leakage-side spiral grooves 15a to 15c in the circumferential direction.

The leakage-side reverse spiral grooves 16a to 16c have a constant depth in the extension direction. Incidentally, in the present embodiment, the leakage-side spiral grooves 15a to 15c and the leakage-side reverse spiral grooves 16a to 16c have the same depth, and the leakage-side spiral grooves 15a to 15c and the leakage-side reverse spiral grooves 16a to 16c are formed deeper than the fluid-side spiral grooves 13 and the fluid-side reverse spiral grooves 14. Further, the capacities of the leakage-side spiral grooves 15a to 15c and the leakage-side reverse spiral grooves 16a to 16c are larger than the capacities of the fluid-side spiral grooves 13 and the fluid-side reverse spiral grooves 14.

The leakage-side reverse spiral grooves 16a to 16c have different lengths. The leakage-side reverse spiral groove 16a is longer than the leakage-side reverse spiral groove 16b, and the leakage-side reverse spiral groove 16b is longer than the leakage-side reverse spiral groove 16c. The end portions 16B of the leakage-side reverse spiral grooves 16a to 16c are disposed side by side in the radial direction.

In addition, the end portions 16B of the leakage-side reverse spiral grooves 16a to 16c are disposed closer to the radially outer side than the end portions 13B of the fluid-side spiral grooves 13 and the end portions 14B of the fluid-side reverse spiral grooves 14.

Incidentally, hereinafter, one set of the fluid-side spiral groove 13 and the fluid-side reverse spiral groove 14 facing each other such that the end portions 13B and 14B approach each other in the circumferential direction will be described, and one set of the leakage-side spiral grooves 15a to 15c and the leakage-side reverse spiral grooves 16a to 16c facing each other such that the end portions 15B and 16B approach each other in the circumferential direction will be described.

One set of the leakage-side spiral grooves 15a to 15c and the leakage-side reverse spiral grooves 16a to 16c are arranged between the fluid-side spiral groove 13 of one set and the fluid-side reverse spiral groove 14 of the other adjacent set in the circumferential direction.

The plurality (three in the present embodiment) of deep grooves 17 are arranged in the circumferential direction on the sliding surface 11. The deep grooves 17 have a constant depth in the extension direction. The deep grooves 17 are formed deeper than the leakage-side spiral grooves 15a to 15c and the leakage-side reverse spiral grooves 16a to 16c. Incidentally, the depth of the deep grooves 17 is set to such a depth that almost no dynamic pressure is generated by relative rotation between the stationary seal ring 10 and the rotating seal ring 20.

The deep groove 17 communicates with the outer space S2 at both end portions 17A and 17B in the circumferential direction, and extends to surround one set of the fluid-side spiral grooves 13 and the fluid-side reverse spiral grooves 14. In detail, the deep groove 17 includes a first portion 171 as a first inclined portion; a second portion 172 as a second inclined portion; and a third portion 173. The first portion 171 is a portion extending substantially parallel to the fluid-side spiral groove 13 and the leakage-side reverse spiral grooves 16a to 16c therebetween. The second portion 172 is a portion extending substantially parallel to the fluid-side reverse spiral groove 14 and the leakage-side spiral grooves 15a to 15c therebetween. The third portion 173 is a portion extending concentrically with the stationary seal ring 10, and connecting radially inner ends of the first portion 171 and the second portion 172.

In addition, portions of the sliding surface 11 other than the fluid-side spiral groove 13, the fluid-side reverse spiral groove 14, the leakage-side spiral grooves 15a to 15c, the leakage-side reverse spiral grooves 16a to 16c, and the deep groove 17 are lands 12 having flat surfaces disposed on the same plane. The flat surfaces of the lands 12 function as sliding surfaces that substantially slide against the sliding surface 21 of the rotating seal ring 20.

The sliding surface 11 is partitioned into fluid-side regions A1 and a leakage-side region A2 by the deep grooves 17. In each of the fluid-side regions A1, one set of the fluid-side spiral groove 13 and the fluid-side reverse spiral groove 14 and the land 12 that partitions the fluid-side spiral groove 13 and the fluid-side reverse spiral groove 14 off from each other are provided. In the leakage-side region A2, all the leakage-side spiral grooves 15a to 15c and the leakage-side reverse spiral grooves 16a to 16c, and the land 12 that partitions the leakage-side spiral grooves 15a to 15c and the leakage-side reverse spiral grooves 16a to 16c off from each other are provided. In other words, the leakage-side region A2 is a region of the sliding surface 11 other than the fluid-side regions A1.

Next, the flow of the sealed fluid F and the atmosphere A during relative rotation between the stationary seal ring 10 and the rotating seal ring 20 will be schematically described with reference to FIG. 2. Incidentally, here, a description will be provided without specifying a relative rotation speed between the stationary seal ring 10 and the rotating seal ring 20.

When the rotating seal ring 20 rotates relative to the stationary seal ring 10 in the forward direction, in the fluid-side spiral groove 13, the sealed fluid F moves to the end portion 13B, and a positive pressure is generated at the end portion 13B and in the vicinity of the end portion 13B. In addition, in the fluid-side reverse spiral groove 14, the sealed fluid F moves to the end portion 14A, and a relative negative pressure is generated at the end portion 14B and in the vicinity of the end portion 14B. In addition, in the leakage-side spiral grooves 15a to 15c, the atmosphere A moves to each of the end portions 15B, and a positive pressure is generated at each of the end portions 15B and in the vicinity of each of the end portions 15B. In addition, in the leakage-side reverse spiral grooves 16a to 16c, the atmosphere A moves to each of the end portions 16A, and a relative negative pressure is generated at each of the end portions 16B and in the vicinity of each of the end portions 16B. Incidentally, the relative negative pressure referred to here represents a state where the pressure is lower than the surrounding pressure, rather than a vacuum state.

On the other hand, when the rotating seal ring 20 rotates relative to the stationary seal ring 10 in the reverse direction, in the fluid-side spiral groove 13, the sealed fluid F moves to the end portion 13A, and a relative negative pressure is generated at the end portion 13B and in the vicinity of the end portion 13B. In addition, in the fluid-side reverse spiral groove 14, the sealed fluid F moves to the end portion 14B, and a positive pressure is generated at the end portion 14B and in the vicinity of the end portion 14B. In addition, in the leakage-side spiral grooves 15a to 15c, the atmosphere A moves to each of the end portions 15A, and a relative negative pressure is generated at each of the end portions 15B and in the vicinity of each of the end portions 15B. In addition, in the leakage-side reverse spiral grooves 16a to 16c, the atmosphere A moves to each of the end portions 16B, and a positive pressure is generated at each of the end portions 16B and in the vicinity of each of the end portions 16B.

Next, a change in the force that separates the sliding surfaces 11 and 21 will be described with reference to FIGS. 3 and 4. Incidentally, here, a case where the rotating seal ring 20 rotates in the forward rotation direction will be described as an example, and the description of a case where the rotating seal ring 20 in the reverse rotation direction will be omitted. In addition, in FIGS. 3 and 4, for convenience of description, the range of a positive pressure generated in each of the spiral grooves is illustrated as being surrounded by an alternating long and short dashed line.

First, when the rotating seal ring 20 is not in rotation and is stopped, the sealed fluid F flows into the fluid-side spiral groove 13 and the fluid-side reverse spiral groove 14 from openings of the end portions 13A and 14A. In addition, the sealed fluid F flows into the deep groove 17 from openings of the end portions 17A and 17B. In addition, the atmosphere A flows into the leakage-side spiral grooves 15a to 15c and the leakage-side reverse spiral grooves 16a to 16c from openings of the end portions 15A and 16A. Incidentally, since the stationary seal ring 10 is biased to a rotating seal ring 20 side by the elastic member 7, the sliding surfaces 11 and 21 are in contact with each other, and there is almost no leakage of the sealed fluid F between the sliding surfaces 11 and 21 into the inner space S1.

Figure 3:
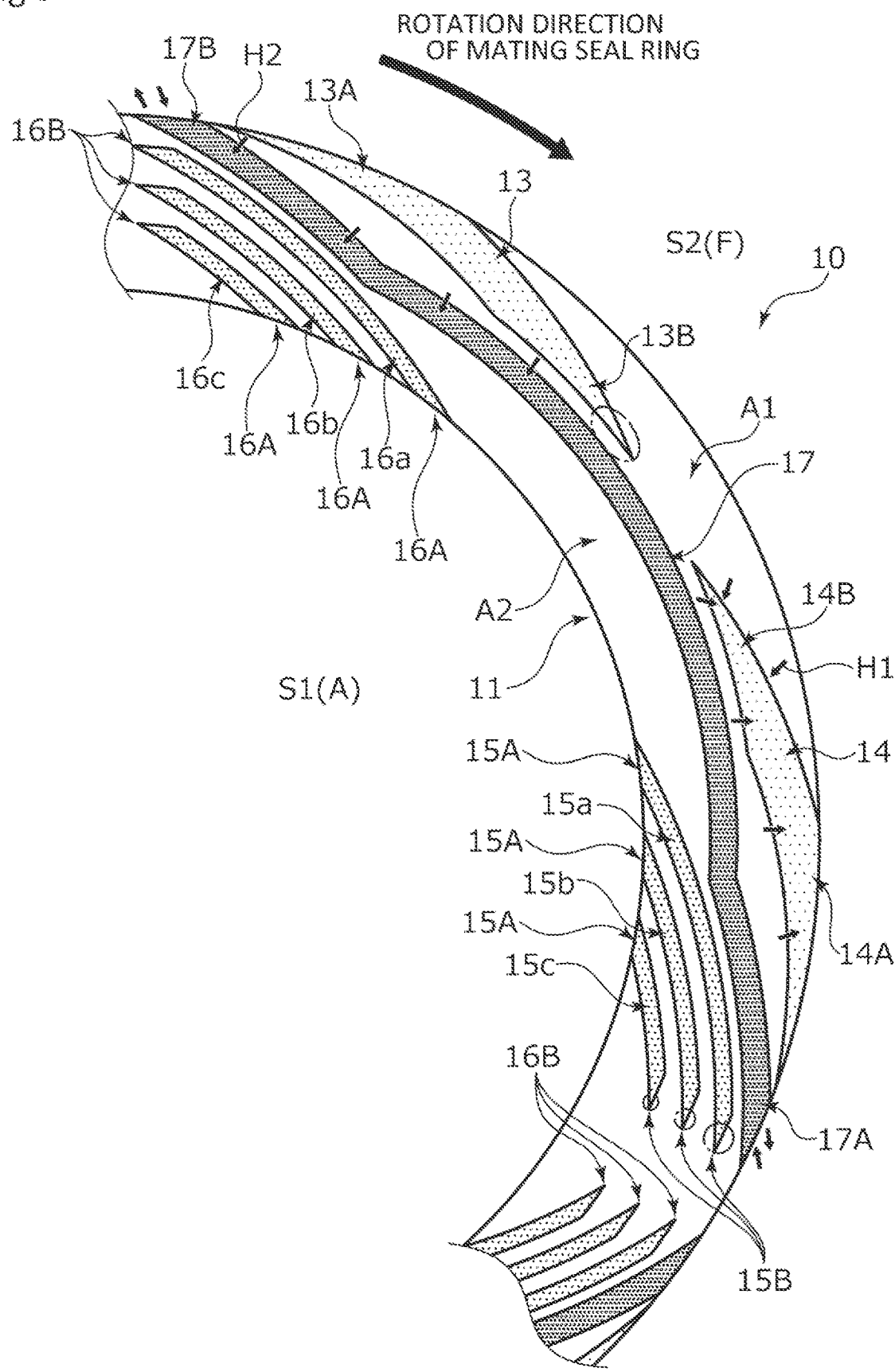
FIG. 3 is an enlarged view of the sliding surface of the stationary seal ring when a rotating seal ring rotates forward at low speed in the first embodiment as viewed in the axial direction.

At low speed immediately after the rotating seal ring 20 starts rotating relative to the stationary seal ring 10, as illustrated in FIG. 3, a positive pressure is generated at the end portion 13B of the fluid-side spiral groove 13 and each of the end portions 15B of the leakage-side spiral grooves 15a to 15c. The sliding surfaces 11 and 21 are slightly separated from each other by the positive pressure.

In detail, since the sealed fluid F having a higher pressure than the atmosphere A flowing into the leakage-side spiral grooves 15a to 15c flows into the fluid-side spiral groove 13, and the capacity of the fluid-side spiral groove 13 is smaller than that of the leakage-side spiral grooves 15a to 15c, a first force caused by the positive pressure generated at the end portion 13B of the fluid-side spiral groove 13 is larger than a second force caused by the positive pressure generated at each of the end portions 15B of the leakage-side spiral grooves 15a to 15c. For this reason, during low-speed rotation of the rotating seal ring 20, the first force mainly acts to separate the sliding surfaces 11 and 21 from each other.

The sealed fluid F is supplied from the fluid-side spiral groove 13 into a gap between the sliding surfaces 11 and 21 in such a manner, and the sliding surfaces 11 and 21 are slightly separated from each other, so that even during low-speed rotation, lubricity can be improved and wear between the sliding surfaces 11 and 21 can be suppressed.

In addition, the sealed fluid F supplied to the fluid-side region A1 on the sliding surface 11 is mainly suctioned into the fluid-side reverse spiral groove 14 as indicated by arrow H1, and is partially collected in the deep groove 17 as indicated by arrow H2. In addition, since the floating distance between the sliding surfaces 11 and 21 is slight, almost no sealed fluid F flows into the leakage-side region A2 on the sliding surface 11. For this reason, the leakage of the sealed fluid F into the inner space S1 is suppressed. Incidentally, when a larger amount of the sealed fluid F than the amount of the sealed fluid F that can be stored in the deep groove 17 is collected, the excess of the sealed fluid F is returned to the outer space S2.

Figure 4:
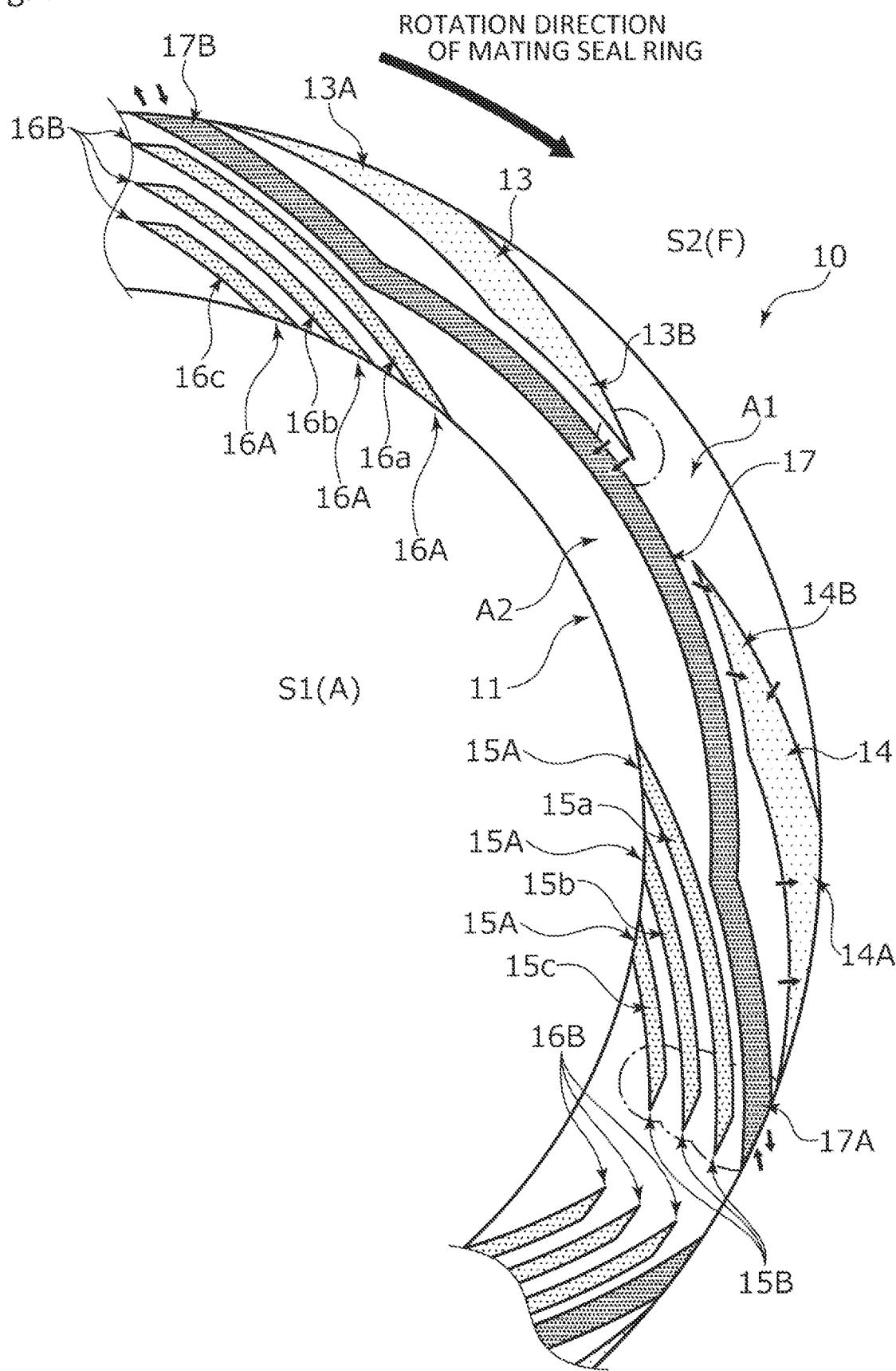
FIG. 4 is an enlarged view of the sliding surface of the stationary seal ring when the rotating seal ring rotates forward at high speed in the first embodiment as viewed in the axial direction.

When the relative rotation speed of the rotating seal ring 20 increases, as illustrated in FIG. 4, the positive pressure generated at the end portion 13B of the fluid-side spiral groove 13 and each of the end portions 15B of the leakage-side spiral grooves 15a to 15c gradually increases. Accordingly, the first force and the second force are increased, so that the sliding surfaces 11 and 21 are further separated from each other compared to the state of FIG. 3.

Incidentally, when the relative rotation speed of the rotating seal ring 20 reaches a certain level or higher, since some of the sealed fluid F supplied from the end portion 13B of the fluid-side spiral groove 13 into the gap between the sliding surfaces 11 and 21 is collected in the deep groove 17 as indicated by arrow H3, the first force caused by the positive pressure generated at the end portion 13B of the fluid-side spiral groove 13 is prevented from increasing any further.

When the relative rotation speed of the rotating seal ring 20 further increases and reaches high-speed rotation, namely, a steady-state operating state, the inflow amount of the atmosphere A suctioned into the leakage-side spiral grooves 15a to 15c further increases so that a high positive pressure is generated to increase the second force. Therefore, the sliding surfaces 11 and 21 are more significantly separated from each other.

In the present embodiment, when the floating distance increases due to high-speed rotation of the rotating seal ring 20, the positive pressure generated in the fluid-side spiral groove 13 becomes negligibly small. Therefore, during high-speed rotation of the rotating seal ring 20, the second force mainly acts to separate the sliding surfaces 11 and 21 from each other.

In addition, in a steady-state operating state of the mechanical seal, the negative pressure generated at each of the end portions 16B of the leakage-side reverse spiral grooves 16a to 16c and in the vicinity of each of the end portions 16B is relatively small, and the positive pressure generated at each of the end portions 15B of the facing leakage-side spiral grooves 15a to 15c acts to push most of the sealed fluid F flowing in from the radially outer side of the leakage-side region A2, out into the outer space S2.

In such a manner, when the relative rotation of the mechanical seal is low-speed forward rotation, the lubricity between the sliding surfaces 11 and 21 is improved mainly by the sealed fluid F supplied from the end portion 13B of the fluid-side spiral groove 13 into the gap between the sliding surfaces 11 and 21. In addition, when the relative rotation of the mechanical seal is high-speed forward rotation, since the sealed fluid F supplied from the fluid-side spiral groove 13 into the gap between the sliding surfaces 11 and 21 is collected in the deep groove 17, the positive pressure in the fluid-side spiral groove 13 is suppressed, and the sliding surfaces 11 and 21 are separated from each other mainly by the positive pressure generated at each of the end portions 15B of the leakage-side spiral grooves 15a to 15c, so that the lubricity is improved.

In addition, since the sealed fluid F that has flowed into the gap between the sliding surfaces 11 and 21 from the end portion 13B of the fluid-side spiral groove 13 is collected by the fluid-side reverse spiral groove 14 and the deep groove 17, the leakage of the sealed fluid F into the inner space S1 due to the suction function of the leakage-side reverse spiral grooves 16a to 16c is suppressed.

In addition, since the sliding surface 11 is provided with the fluid-side reverse spiral groove 14 having a symmetrical shape with respect to the fluid-side spiral groove 13 in the circumferential direction, and with the leakage-side reverse spiral grooves 16a to 16c having a symmetrical shape with respect to the leakage-side spiral grooves 15a to 15c in the circumferential direction, when the relative rotation of the mechanical seal is reverse rotation, the same function as described above is exhibited.

In addition, since the deep groove 17 communicates with the outer space S2, the inflow and outflow of the sealed fluid F can be performed between the deep groove 17 and the outer space S2, and the amount of the sealed fluid F in the deep groove 17 is stabilized. Namely, the sealed fluid F supplied from the fluid-side spiral groove 13 or the fluid-side reverse spiral groove 14 into the gap between the sliding surfaces 11 and 21 can be reliably collected in the deep groove 17.

In addition, each of the end portions 15A and 16A of the leakage-side spiral grooves 15a to 15c and the leakage-side reverse spiral grooves 16a to 16c communicates with the inner space S1. According to this configuration, during relative rotation of the mechanical seal in the forward direction, the atmosphere A can be introduced from the inner space S1 into the leakage-side spiral grooves 15a to 15c, and during relative rotation in the reverse direction, the atmosphere A can be introduced from the inner space S1 into the leakage-side reverse spiral grooves 16a to 16c, so that a positive pressure can be stably generated in the leakage-side spiral grooves 15a to 15c and the leakage-side reverse spiral grooves 16a to 16c.

In addition, each of the end portions 15B of the leakage-side spiral grooves 15a to 15c and each of the end portions 16B of the leakage-side reverse spiral grooves 16a to 16c are disposed closer to the radially outer side, namely, an outer space S2 side than the end portion 13B of the fluid-side spiral groove 13 and the end portion 14B of the fluid-side reverse spiral groove 14. According to this configuration, a sufficient length can be ensured for each of the spiral grooves.

In addition, since the deep groove 17 includes the first portion 171 extending along the fluid-side spiral groove 13 and the leakage-side reverse spiral grooves 16a to 16c and the second portion 172 extending along the fluid-side reverse spiral groove 14 and the leakage-side spiral grooves 15a to 15c, the plurality of spiral grooves can be efficiently disposed in the circumferential direction.

Second Embodiment

Figure 5:
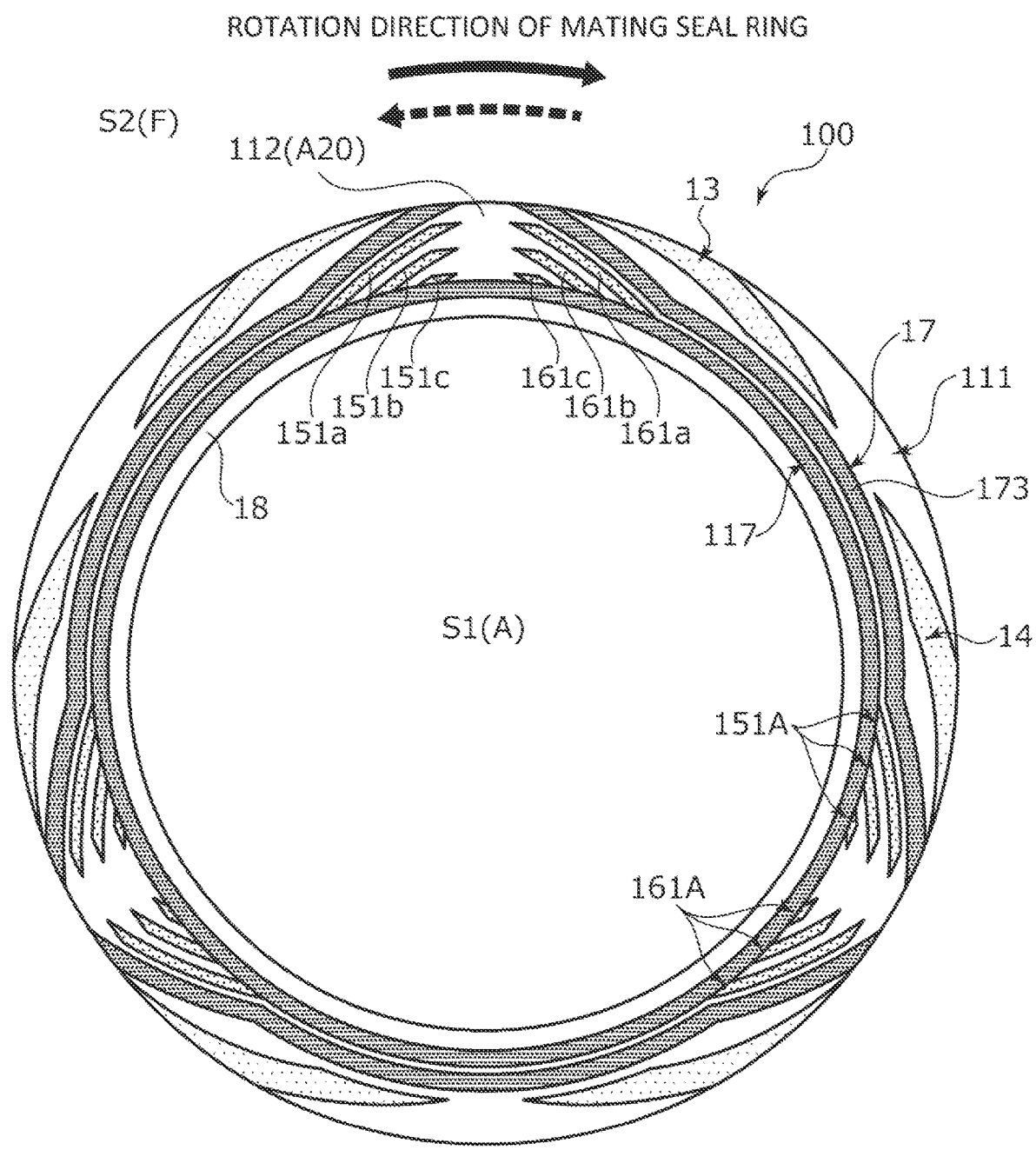
FIG. 5 is a view of a sliding surface of a stationary seal ring included in a sliding component according to a second embodiment of the present invention as viewed in the axial direction.

Next, a sliding component according to a second embodiment of the present invention will be described with reference to FIG. 5. Incidentally, the description of configurations that are the same as and overlap with the configurations of the first embodiment will be omitted.

An annular land 18 is provided at an edge portion on the radially inner side of a sliding surface 111 of a stationary seal ring 100 of the second embodiment. An annular deep groove 117 as a communication groove is formed concentrically with the stationary seal ring 100 on the radially outer side of the annular land 18. The annular deep groove 117 and the third portion 173 of the deep groove 17 are partitioned off from each other by a land 112 forming a leakage-side region A20. Incidentally, the annular deep groove 117 is formed to such a depth that almost no dynamic pressure is generated by relative rotation of the mechanical seal.

Leakage-side spiral grooves 151a to 151c and leakage-side reverse spiral grooves 161a to 161c are provided on the radially outer side of the annular deep groove 117. Each of end portions 151A of the leakage-side spiral grooves 151a to 151c and each of end portions 161A of the leakage-side reverse spiral grooves 161a to 161c communicate with the annular deep groove 117. Incidentally, configurations other than described above are the same as the configurations of the first embodiment.

According to this configuration, during relative rotation of the mechanical seal in the forward direction, the sealed fluid F collected in the leakage-side reverse spiral grooves 161a to 161c can be guided to the leakage-side spiral grooves 151a to 151c through the annular deep groove 117. In addition, during relative rotation of the mechanical seal in the reverse direction, the sealed fluid F collected in the leakage-side spiral grooves 151a to 151c can be guided to the leakage-side reverse spiral grooves 161a to 161c through the annular deep groove 117. For this reason, the sealed fluid F collected in the leakage-side spiral grooves 151a to 151c and the leakage-side reverse spiral grooves 161a to 161c is less likely to leak into the inner space S1.

In addition, the annular deep groove 117 can collect the sealed fluid F from a portion other than the leakage-side spiral grooves 151a to 151c and the leakage-side reverse spiral grooves 161a to 161c, namely, from the land 112 forming the leakage-side region A20.

Further, the annular land 18 is formed on the radially inner side of the annular deep groove 117. In other words, since the annular deep groove 117 and the inner space S1 are divided by the annular land 18, the sealed fluid F collected in the annular deep groove 117 is less likely to leak into the inner space S1.

Incidentally, in the present embodiment, the mode in which the deep groove and the communication groove having an annular shape are partitioned off from each other by the land has been provided as an example; however, the deep groove and the communication groove having an annular shape may communicate with each other.

Third Embodiment

Figure 6:
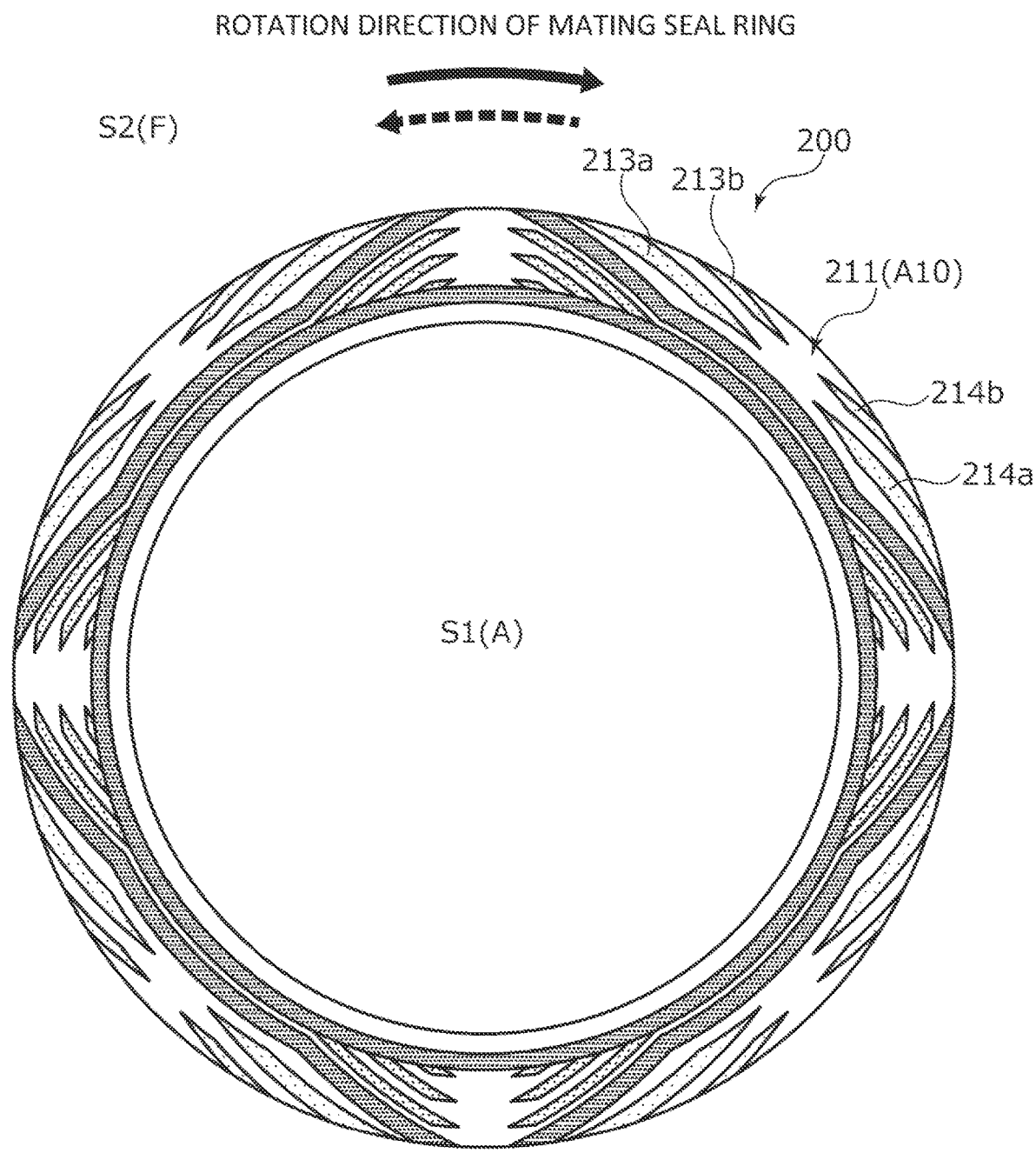
FIG. 6 is a view of a sliding surface of a stationary seal ring included in a sliding component according to a third embodiment of the present invention as viewed in the axial direction.

Next, a sliding component according to a third embodiment of the present invention will be described with reference to FIG. 6. Incidentally, the description of configurations that are the same as and overlap with the configurations of the second embodiment will be omitted.

Two fluid-side spiral grooves 213a and 213b and two fluid-side reverse spiral grooves 214a and 214b are provided in a fluid-side region A10 of a sliding surface 211 of a stationary seal ring 200 of the third embodiment.

The fluid-side spiral groove 213a is longer than the fluid-side spiral groove 213b. In addition, the fluid-side spiral groove 213a is disposed side by side with the fluid-side spiral groove 213b in the reverse rotation direction of the rotating seal ring 20.

The fluid-side reverse spiral groove 214a is longer than the fluid-side reverse spiral groove 214b, and has the same length as the fluid-side spiral groove 213a. In addition, the fluid-side reverse spiral groove 214a is disposed side by side with the fluid-side reverse spiral groove 214b in the forward rotation direction of the rotating seal ring 20.

In addition, the fluid-side spiral groove 213b and the fluid-side reverse spiral groove 214b have the same length. Incidentally, configurations other than described above are the same as the configurations of the second embodiment.

Fourth Embodiment

Figure 7:
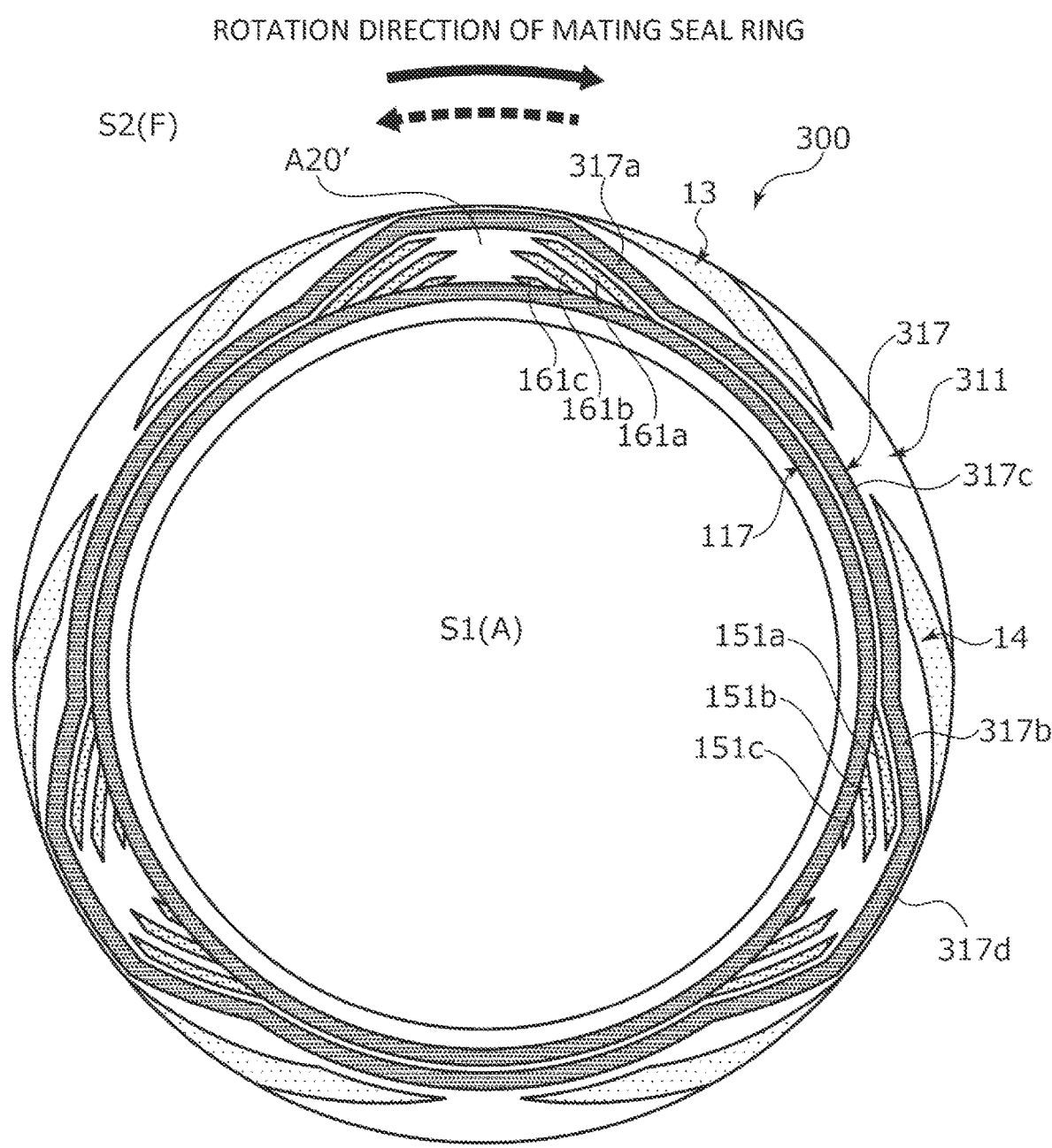
FIG. 7 is a view of a sliding surface of a stationary seal ring included in a sliding component according to a fourth embodiment of the present invention as viewed in the axial direction.

Next, a sliding component according to a fourth embodiment of the present invention will be described with reference to FIG. 7. Incidentally, the description of configurations that are the same as and overlap with the configurations of the second embodiment will be omitted.

A sliding surface 311 of a stationary seal ring 300 of the fourth embodiment is provided with a deep groove 317 that is continuous in the circumferential direction. The deep groove 317 includes a first portion 317a, a second portion 317b, a third portion 317c, and a fourth portion 317d.

The first portion 317a is a portion extending substantially parallel to the fluid-side spiral groove 13 and the leakage-side reverse spiral grooves 161a to 161c therebetween. A radially outer end of the first portion 317a does not communicate with the outer space S2. The second portion 317b is a portion extending substantially parallel to the fluid-side reverse spiral groove 14 and the leakage-side spiral grooves 151a to 151c therebetween. A radially outer end of the second portion 317b does not communicate with the outer space S2.

The third portion 317c is a portion extending concentrically with the stationary seal ring 300, and connecting radially inner ends of the first portion 317a and the second portion 317b. The fourth portion 317d is a portion extending concentrically with the stationary seal ring 300, and connecting radially outer ends of the first portion 317a and the second portion 317b.

According to this configuration, since the endless deep groove 317 is disposed between a leakage-side region A20' and the outer space S2, the amount of the sealed fluid F flowing into the leakage-side region A20' is small, so that the leakage of the sealed fluid F into the inner space S1 can be reduced as much as possible.

Fifth Embodiment

Figure 8:
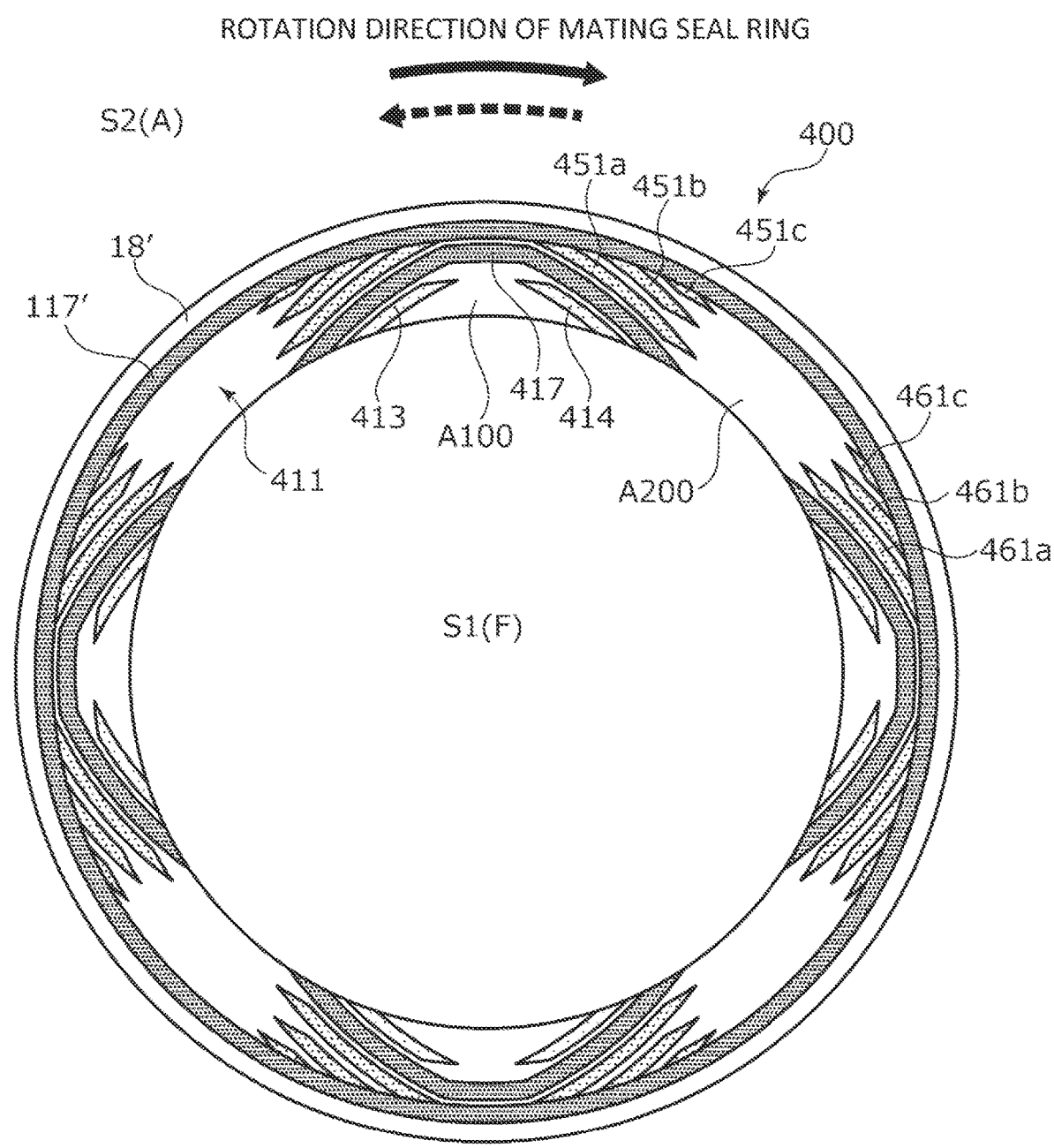
FIG. 8 is a view of a sliding surface of a stationary seal ring included in a sliding component according to a fifth embodiment of the present invention as viewed in the axial direction.

Next, a sliding component according to a fifth embodiment of the present invention will be described with reference to FIG. 8. Incidentally, the description of configurations that are the same as and overlap with the configurations of the second embodiment will be omitted.

A mechanical seal of the fifth embodiment is an outside mechanical seal that seals the sealed fluid F in the inner space S1 and that allows the outer space S2 to communicate with the atmosphere A. Namely, in the fifth embodiment, the inner space S1 functions as a fluid-side space, and the outer space S2 functions as a leakage-side space.

An annular land 18' is provided at an edge portion on the radially outer side of a sliding surface 411 of a stationary seal ring 400 of the fifth embodiment. An annular deep groove 117' as a communication groove is formed on the radially inner side of the annular land 18'. Four deep grooves 417, each communicating with the inner space S1 at both ends, are provided in the circumferential direction on the radially inner side of the annular deep groove 117'. The deep grooves 417 do not communicate with the outer space S2.

A fluid-side spiral groove 413 and a fluid-side reverse spiral groove 414 are provided in a fluid-side region A100. Leakage-side spiral grooves 451a to 451c and leakage-side reverse spiral grooves 461a to 461c are provided in a leakage-side region A200. The leakage-side spiral grooves 451a to 451c and the leakage-side reverse spiral grooves 461a to 461c communicate with the annular deep groove 117', and extend to the radially inner side.

The embodiments of the present invention have been described above with reference to the drawings; however, the specific configurations are not limited to the embodiments, and the present invention also includes changes or additions that are made without departing from the scope of the present invention.

For example, in the first to fifth embodiments, the mechanical seal has been described as an example of the sliding component; however, the present invention may be applied to other mechanical seals for general industrial machines, automobiles, water pumps, and the like. In addition, the present invention is not limited to the mechanical seal, and may be applied to sliding components other than the mechanical seal, such as a slide bearing.

Figure 9:
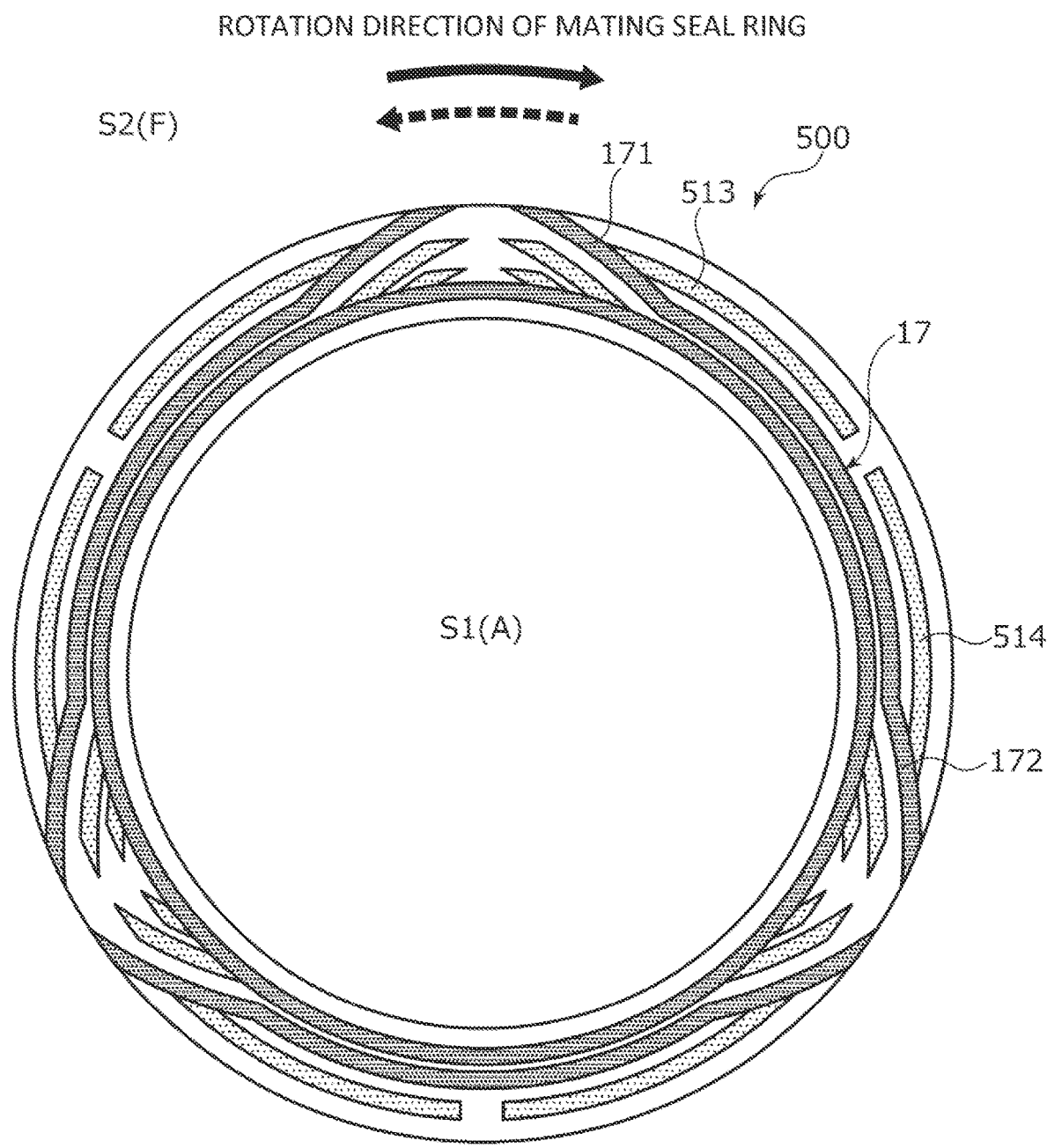
FIG. 9 is a schematic view illustrating a modification example of fluid-side grooves and fluid-side reverse grooves in the first to fifth embodiments.

In addition, in the first to fifth embodiments, the mode in which the fluid-side grooves and the fluid-side reverse grooves directly communicate with the fluid-side space has been provided as an example; however, as in a stationary seal ring 500 illustrated in FIG. 9, a fluid-side groove 513 may extend from the first portion 171 of the deep groove 17 in the one circumferential direction so as to be concentric with the stationary seal ring 500, and a fluid-side reverse groove 514 may extend from the second portion 172 of the deep groove 17 in the other circumferential direction so as to be concentric with the stationary seal ring 500. In other words, the fluid-side groove 513 and the fluid-side reverse groove 514 may communicate with the outer space S2, namely, the fluid-side space via the deep groove 17. In addition, the fluid-side groove 513 and the fluid-side reverse groove 514 may not have a radial component, namely, may not be spiral grooves.

In addition, in the first to fifth embodiments, the mode in which the fluid-side groove and the fluid-side reverse groove have a symmetrical shape, the leakage-side groove and the leakage-side reverse groove have a symmetrical shape, and a positive pressure and a relative negative pressure are generated in the same manner in both the forward direction and the reverse direction of relative rotation has been provided as an example; the present invention is not limited to the mode, and each groove may be formed in an asymmetrical shape, so that a positive pressure and a relative negative pressure are generated differently between the forward direction and the reverse direction of relative rotation.

In addition, in the first to fifth embodiments, the mode in which the communication groove communicating with the leakage-side end portions of the leakage-side grooves and the leakage-side reverse grooves is a deep groove has been provided as an example; however, the communication groove may be a shallow groove having such a depth that a dynamic pressure is generated by relative rotation of the mechanical seal.

In addition, in the second to fifth embodiments, the mode in which the communication groove has an annular shape has been provided as an example; however, the present invention is not limited to the mode, and the communication groove may extend in an arcuate shape to communicate with the leakage-side end portions of the leakage-side grooves and the leakage-side reverse grooves. Incidentally, the communication groove is not limited to an arcuate shape, and may extend in a sinusoidal shape or a linear shape.

In addition, the number of the grooves and the deep grooves may be freely changed.

In addition, in the first to fifth embodiments, the mode in which the degrees of inclination of the fluid-side groove and the leakage-side reverse groove and of the fluid-side reverse groove and the leakage-side groove in the circumferential direction as viewed in the axial direction are almost the same has been provided as an example; however, the degrees of inclination in the circumferential direction may be different from each other.

In addition, in the first to fifth embodiments, the mode in which each groove is provided on the stationary seal ring has been provided as an example; however, each groove may be provided on the rotating seal ring.

In addition, in the first to fifth embodiments, the mode in which each groove has a constant depth in the extension direction has been provided as an example; however, a step or an inclined surface may be provided on a bottom surface of each groove.

In addition, in the first to fifth embodiments, the mode in which the fluid-side groove and the fluid-side reverse groove are shallower than the leakage-side groove and the leakage-side reverse groove and have a smaller capacity has been provided as an example; however, the depth and capacity of the fluid-side groove and the fluid-side reverse groove may be formed to be approximately the same as the depth and capacity of the leakage-side groove and the leakage-side reverse groove.

In addition, the sealed fluid side and the leakage side have been described as a high-pressure side and a low-pressure side, respectively; however, the sealed fluid side and the leakage side may be a low-pressure side and a high-pressure side, respectively, or the sealed fluid side and the leakage side may have substantially the same pressure.

In addition, in the first to fifth embodiments, the sealed fluid F has been described as a high-pressure liquid, but is not limited thereto, and may be a gas or a low-pressure liquid or may be in the form of a mist that is a mixture of liquid and gas.

In addition, in the first to fifth embodiments, the leakage-side fluid has been described as the atmosphere A that is a low-pressure gas, but is not limited thereto, and may be a liquid or a high-pressure gas or may be in the form of a mist that is a mixture of liquid and gas.

REFERENCE SIGNS LIST

10 Stationary seal ring
11 Sliding surface
12 Land
13 Fluid-side spiral groove (fluid-side groove)
13A End portion
13B End portion (terminating end portion)
14 Fluid-side reverse spiral groove (fluid-side reverse groove)
14A End portion
14B End portion (terminating end portion)
15A End portion
15B End portion (terminating end portion, leakage-side end portion)
15a to 15c Leakage-side spiral groove (leakage-side groove)
16A End portion
16B End portion (terminating end portion)
16a to 16c Leakage-side reverse spiral groove (leakage-side reverse groove)
17 Deep groove
18 Annular land
20 Rotating seal ring
21 Sliding surface
117 Annular deep groove
A Atmosphere
A1 Fluid-side region
A2 Leakage-side region
F Sealed fluid
S1 Inner space (leakage-side space)
S2 Outer space (fluid-side space)

The invention claimed is:

1. A sliding component, comprising
a pair of sliding surfaces for being disposed in a rotating machine to face each other at a location where the pair of sliding surfaces rotate relative to each other when the rotating machine is driven, and partitioning a fluid-side space and a leakage-side space off from each other,
wherein one of the sliding surfaces is provided with:
a fluid-side groove which has an opened end portion communicating with the fluid-side space and a closed end portion opposed to the opened end portion in a radial direction and which extends from the opened end portion to the closed end portion in a forward direction of relative rotation of the sliding surfaces;
a fluid-side reverse groove which has an opened end portion communicating with the fluid-side space and a closed end portion opposed to the opened end portion in a radial direction and which extends from the opened end portion to the closed end portion in a reverse direction of the relative rotation;
a leakage-side groove of which at least one end portion is disposed closer to a side of the leakage-side space than the fluid-side groove and the fluid-side reverse groove, and which extends from the end portion toward the fluid-side space in the forward direction of the relative rotation;
a leakage-side reverse groove of which at least one end portion is disposed closer to the side of the leakage-side space than the fluid-side groove and the fluid-side reverse groove, and which extends from the end portion toward the fluid-side space in the reverse direction of the relative rotation; and
a deep groove that partitions a fluid-side region where the fluid-side groove and the fluid-side reverse groove are provided and a leakage-side region where the leakage-side groove and the leakage-side reverse groove are provided off from each other, and
the fluid-side reverse groove is disposed on a downstream side in the forward direction of relative rotation with respect to the fluid-side groove in the fluid-side region.

2. The sliding component according to claim 1,
wherein the deep groove communicates with the fluid-side space.

3. The sliding component according to claim 1,
wherein each of the leakage-side end portions of the leakage-side groove and the leakage-side reverse groove communicate with the leakage-side space.

4. The sliding component according to claim 1,
wherein the one of the sliding surfaces is provided with a communication groove communicating with each of leakage-side end portions of the leakage-side groove and the leakage-side reverse groove.

5. The sliding component according to claim 4,
wherein the communication groove has an annular shape.

6. The sliding component according to claim 1,
wherein each of terminating end portions of the leakage-side groove and the leakage-side reverse groove is disposed closer to a fluid-side space side than each of terminating end portions of the fluid-side groove and the fluid-side reverse groove.

7. The sliding component according to claim 6,
wherein the fluid-side groove, the leakage-side reverse groove, the fluid-side reverse groove, and the leakage-side groove are disposed in an inclined manner, and
the deep groove includes a first inclined portion extending along the fluid-side groove and the leakage-side reverse groove, and a second inclined portion extending along the fluid-side reverse groove and the leakage-side groove.

8. The sliding component according to claim 2,
wherein each of the leakage-side end portions of the leakage-side groove and the leakage-side reverse groove communicate with the leakage-side space.

9. The sliding component according to claim 2,
wherein the one of the sliding surfaces is provided with a communication groove communicating with each of leakage-side end portions of the leakage-side groove and the leakage-side reverse groove.

10. The sliding component according to claim 9,
wherein the communication groove has an annular shape.

11. The sliding component according to claim 1,
wherein the deep groove is an annular deep groove which does not communicate with the fluid-side space and the leakage-side space.

12. The sliding component according to claim 1,
wherein deep groove has fluid-side deep groove portions which are disposed to be closer to the fluid-side space than leakage-side groove and the leakage-side reverse groove and which extend in the circumferential direction, leakage-side deep groove portions which are disposed to be closer to the leakage-side space than the fluid-side groove and which extend in the circumferential direction, the fluid-side reverse groove and the fluid-side deep groove portion, and slant deep groove portions each of which connect the fluid-side deep groove portion and the leakage-side deep groove portion adjacent to each other in the circumferential direction, the leakage-side region is between the fluid-side deep groove portion and the leakage-side space in the radial direction, and the fluid-side region is between the leakage-side deep groove portion and the fluid-side space in the radial direction.

* * * * *